United States Patent
Meng et al.

(10) Patent No.: US 12,093,635 B2
(45) Date of Patent: Sep. 17, 2024

(54) SENTENCE ENCODING AND DECODING METHOD, STORAGE MEDIUM, AND DEVICE

(71) Applicant: TENCENT TECHNOLOGY (SHENZHEN) COMPANY LIMITED, Shenzhen (CN)

(72) Inventors: Fandong Meng, Shenzhen (CN); Jinchao Zhang, Shenzhen (CN); Jie Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 566 days.

(21) Appl. No.: 17/181,490

(22) Filed: Feb. 22, 2021

(65) Prior Publication Data

US 2021/0174003 A1 Jun. 10, 2021

Related U.S. Application Data

(63) Continuation of application No. PCT/CN2019/121420, filed on Nov. 28, 2019.

(30) Foreign Application Priority Data

Nov. 29, 2018 (CN) .......................... 201811444710.8

(51) Int. Cl.
  *G06F 17/00* (2019.01)
  *G06F 40/126* (2020.01)
  (Continued)

(52) U.S. Cl.
  CPC .......... *G06F 40/126* (2020.01); *G06F 40/151* (2020.01); *G06F 40/284* (2020.01); *G06F 40/58* (2020.01)

(58) Field of Classification Search
  CPC ........ G06F 40/10; G06F 40/166; G06F 40/12; G06F 40/126; G06F 40/131;
  (Continued)

(56) References Cited

U.S. PATENT DOCUMENTS 10,867,597 B2 * 12/2020 Deoras ................ G10L 15/1815
10,949,615 B2 * 3/2021 Noh ........................ G06F 40/30
(Continued)

FOREIGN PATENT DOCUMENTS

CA 3065807 A1 * 12/2018 ............. G06N 20/00
CN 107220231 A 9/2017
(Continued)

OTHER PUBLICATIONS

Wang, Mengqiu, and Christopher D. Manning. "Effect of non-linear deep architecture in sequence labeling." Proceedings of the Sixth International Joint Conference on Natural Language Processing. 2013. (Year: 2013).*

(Continued)

*Primary Examiner* — Michael Ortiz-Sanchez
(74) *Attorney, Agent, or Firm* — Crowell & Moring LLP

(57) ABSTRACT

Embodiments of this disclosure disclose a sentence processing method and device. The method may include performing word segmentation operation on a source sentence to be encoded to obtain m words. The method may further include obtaining an $i^{th}$ word in the m words using an $i^{th}$ encoding processing node in the n encoding processing nodes, and obtaining an $(i-1)^{th}$ word vector from an $(i-1)^{th}$ encoding processing node. The method may further include performing linear operation and non-linear operation on the $i^{th}$ word and the $(i-1)^{th}$ word vector using the first unit of the $i^{th}$ encoding processing node to obtain an $i^{th}$ operation result, and outputting the $i^{th}$ operation result to the at least one second unit for processing to obtain an $i^{th}$ word vector. The (Continued)

method may further include generating, in response to obtaining m word vectors, a sentence vector according to the m word vectors.

20 Claims, 12 Drawing Sheets

(51) Int. Cl.
*G06F 40/151* (2020.01)
*G06F 40/284* (2020.01)
*G06F 40/58* (2020.01)

(58) Field of Classification Search
CPC ...... G06F 40/137; G06F 40/14; G06F 40/151; G06F 40/205; G06F 40/284; G06F 40/279; G06F 40/58; G06F 18/00; G06F 18/20; G06F 40/289; G06F 40/274; G06F 40/20; G06F 40/216; G06N 20/00; G06N 3/02; G06N 3/042
See application file for complete search history.

(56) References Cited

U.S. PATENT DOCUMENTS

| | | | |
|---|---|---|---|
| 2009/0210218 A1* | 8/2009 | Collobert | G06F 40/284 704/9 |
| 2017/0278510 A1* | 9/2017 | Zhao | G06F 40/30 |
| 2018/0225281 A1* | 8/2018 | Song | G06N 5/02 |
| 2018/0336190 A1* | 11/2018 | Ishida | G06N 3/044 |
| 2020/0387574 A1* | 12/2020 | Min | G06N 3/04 |

FOREIGN PATENT DOCUMENTS

| | | |
|---|---|---|
| CN | 107391501 A | 11/2017 |
| CN | 107632981 A | 1/2018 |
| CN | 107729329 A | 2/2018 |
| CN | 108304788 A | 7/2018 |
| CN | 108399230 A | 8/2018 |
| CN | 110263304 A | 9/2019 |
| JP | 2017-076403 | 4/2017 |
| JP | 2018-073163 | 5/2018 |
| WO | WO2012/026667 A2 | 3/2012 |

OTHER PUBLICATIONS

Official Action issued on Japanese Application 2021-516821 on Jun. 4, 2022, 4 pages.
Translation of Office Action issued on Japanese Application 2021-516821, 8 pages.
Office Action issued on Chinese Application 201811444710.8 on Sep. 19, 2022, 7 pages.
English translation of International Search Report issued Feb. 26, 2020 in International Application No. PCT/CN2019/121420.

* cited by examiner

SENTENCE ENCODING AND DECODING METHOD, STORAGE MEDIUM, AND DEVICE

CROSS-REFERENCE TO RELATED APPLICATIONS

This application is a continuation application of PCT Patent Application No. PCT/CN2019/121420, filed on Nov. 28, 2019, which claims priority to Chinese Patent Application No. 201811444710.8, filed with the China Intellectual Property Administration on Nov. 29, 2018, and entitled "SENTENCE ENCODING METHOD AND APPARATUS, SENTENCE DECODING METHOD AND APPARATUS, STORAGE MEDIUM AND DEVICE", wherein the content of each of the above-referenced applications is incorporated herein by reference in its entirety.

FIELD OF THE TECHNOLOGY

Embodiments of this disclosure relate to the field of sentence processing, and in particular, to a sentence processing method and apparatus, a sentence decoding method and apparatus, a storage medium, and a device.

BACKGROUND OF THE DISCLOSURE

A computer may process an inputted sentence and then output another sentence. Using machine translation as an example, machine translation refers to a translation method of translating sentences of one natural language into sentences of another natural language by using a computer. Generally, machine translation translates sentences by using a trained machine learning model. For example, after a user inputs a Chinese sentence "房价持续增长" into the machine learning model, the machine learning model outputs an English sentence "The housing prices continued to rise".

In the related technologies, the machine learning model includes an encoding model and a decoding model. The encoding model is configured to encode a source sentence of one natural language into a sentence vector, and output the sentence vector to the decoding model; and the decoding model is configured to decode the sentence vector into a target sentence of another natural language. For example, both the encoding model and the decoding model are formed by neural network models. Currently, the accuracy of sentence processing of a sentence processing model is relatively low.

SUMMARY

According to embodiments provided in this disclosure, a sentence processing method and apparatus, a sentence decoding method and apparatus, a storage medium, and a device are provided.

According to one aspect, a sentence processing method is provided, performed by a sentence processing device and applicable to an encoding model. The encoding model may include n cascaded encoding processing nodes, the encoding processing node may include a first unit and at least one second unit that are cascaded, n>2. The method may include performing a word segmentation operation on a source sentence to be encoded to obtain m words, m<n. The method may further include obtaining an $i^{th}$ word in the m words using an ith encoding processing node in the n encoding processing nodes, and obtaining an $(i-1)^{th}$ word vector from an $(i-1)^{th}$ encoding processing node. The $(i-1)^{th}$ word vector is an encoding vector of an $(i-1)^{th}$ word in the m words, i<m. The method may further include performing linear operation and non-linear operation on the ith word and the $(i-1)^{th}$ word vector using the first unit of the $i^{th}$ encoding processing node to obtain an $i^{th}$ operation result, and outputting the $i^{th}$ operation result to the at least one second unit for processing to obtain an $i^{th}$ word vector. The method may further include generating, in response to obtaining m word vectors, a sentence vector according to the m word vectors. The sentence vector may be for determining a target sentence or a target category.

According to one aspect, a sentence decoding method is provided, performed by a sentence processing device and applicable to a decoding model. The decoding model may include a decoding processing node. The decoding processing node may include a first unit and at least one second unit that are cascaded. The method may include obtaining a sentence vector and a $j^{th}$ query state at a $j^{th}$ moment. The sentence vector is obtained by encoding a source sentence using an encoding model. The $j^{th}$ query state may be for querying an encoded portion in the source sentence at the $j^{th}$ moment. The method may include generating a $j^{th}$ source-language-focused context according to the sentence vector and the $j^{th}$ query state. The $j^{th}$ source-language-focused context may be the encoded portion in the source sentence at the $j^{th}$ moment. The method may further include performing linear operation and non-linear operation on the $j^{th}$ query state and the $j^{th}$ source-language-focused context using the first unit of the decoding processing node to obtain a $j^{th}$ operation result. The method may further include outputting the $j^{th}$ operation result to the at least one second unit of the decoding processing node for processing to obtain a $j^{th}$ word, and generating, in response to obtaining k words, a target sentence according to the k words, j≤k.

According to one aspect, one or more non-transitory machine-readable storage media storing processor executable instructions are provided, the processor executable instructions, when executed by one or more processors, causing the one or more processors to perform at least one of the sentence processing method or the sentence decoding method described above.

According to one aspect, a sentence processing device is provided, including a memory and a processor. The memory may store computer-readable instructions and an encoding model. The encoding model may include n cascaded encoding processing nodes, the encoding processing node may include a first unit and at least one second unit that are cascaded, n>2. The computer-readable instructions, when executed by the processor, may cause the processor to perform a word segmentation operation on a source sentence to be encoded to obtain m words, m<n. The computer-readable instructions may further cause the processor to obtain an $i^{th}$ word in the m words using an $i^{th}$ encoding processing node in the n encoding processing nodes, and obtain an $(i-1)^{th}$ word vector from an $(i-1)^{th}$ encoding processing node. The $(i-1)^{th}$ word vector is an encoding vector of an $(i-1)^{th}$ word in the m words, i<m. The computer-readable instructions may further cause the processor to perform linear operation and non-linear operation on the $i^{th}$ word and the $(i-1)^{th}$ word vector using the first unit of the $i^{th}$ encoding processing node to obtain an $i^{th}$ operation result. The computer-readable instructions may further cause the processor to output the $i^{th}$ operation result to the at least one second unit for processing to obtain an $i^{th}$ word vector, and generate, in response to obtaining m word vectors, a sentence vector according to the m word vectors. The sentence vector may be for determining a target sentence or a target category.

Details of one or more embodiments of this disclosure are provided in the accompanying drawings and descriptions below. Other features, objectives, and advantages of this disclosure become apparent from the specification, the accompanying drawings, and the claims.

BRIEF DESCRIPTION OF THE DRAWINGS

To describe the technical solutions in the embodiments of this disclosure more clearly, the following briefly introduces the accompanying drawings required for describing the embodiments. The accompanying drawings in the following description show only some embodiments of this disclosure, and a person of ordinary skill in the art may still derive other accompanying drawings from these accompanying drawings without creative efforts.

DESCRIPTION OF EMBODIMENTS

Figure 1:
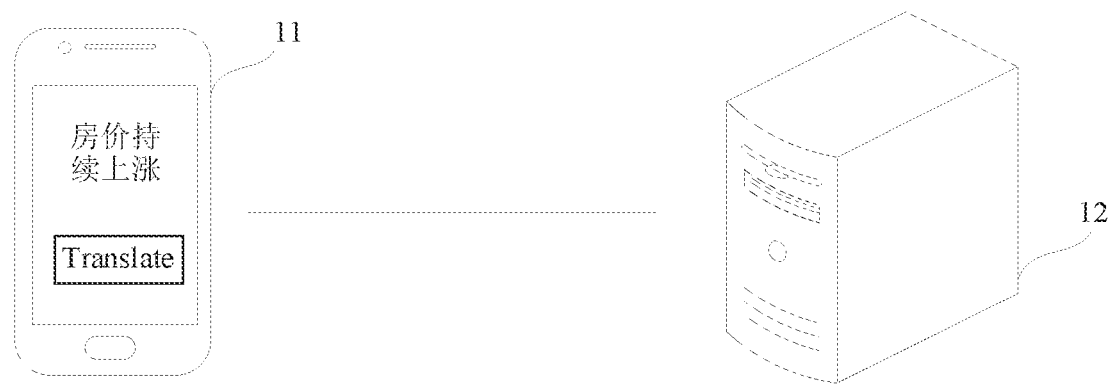
FIG. 1 is a schematic structural diagram of a sentence processing system according to some exemplary embodiments.

To make objectives, technical solutions, and advantages of the embodiments of this disclosure clearer, the following further describes in detail implementations of this disclosure with reference to the accompanying drawings.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology of computer science, which attempts to understand essence of intelligence and produces a new intelligent machine that responds in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including a hardware-level technology and a software-level technology. The basic AI technology generally includes technologies such as a sensor, a dedicated AI chip, cloud computing, distributed storage, a big data processing technology, an operating/interaction system, and electromechanical integration. The AI software technology mainly includes several major directions such as a computer vision technology, a speech processing technology, a natural language processing technology, and machine learning/deep learning.

Key technologies of the speech technology include an automatic speech recognition (ASR) technology, a text-to-speech (TTS) technology, and a voiceprint recognition technology. To make a computer able to listen, see, speak, and feel is the future development direction of human-computer interaction, and speech becomes one of the most promising human-computer interaction methods in the future.

Natural language processing (NLP) is an important direction in the field of computer technologies and the field of AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. The NLP technology generally includes technologies such as text processing, semantic understanding, machine translation, robot question and answer, and knowledge graph.

Machine learning (ML) is a multi-disciplinary subject involving a plurality of disciplines such as probability theory, statistics, approximation theory, convex analysis, and algorithm complexity theory. The machine learning specializes in studying how a computer simulates or implements a human learning behavior to obtain new knowledge or skills, and reorganize an existing knowledge structure, so as to keep improving its performance. The machine learning is a core of the AI, is a basic way to make the computer intelligent, and is applied to various fields of the AI. The machine learning and deep learning generally include technologies such as an artificial neural network, a belief network, reinforcement learning, transfer learning, inductive learning, and learning from demonstrations.

With the research and progress of the AI technology, the AI technology is studied and applied in a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this disclosure relate to technologies such as NLP of AI, which are specifically described by using the following embodiments.

The following first introduces application scenarios involved in this disclosure.

This disclosure mainly involves two types of application scenarios. In the first type of application scenarios, a machine learning model generates sentences according to sentences, and in the second type of application scenarios, the machine learning model classifies sentences. The two types of application scenarios are described below respectively.

The first type of application scenarios may include a plurality of application scenarios, and descriptions are made below by using three application scenarios of machine translation, human-machine dialog, and automatic text generation as examples.

1) Machine Translation

The machine translation refers to a translation manner of translating sentences of one natural language into sentences of another natural language by using a computer. Generally, the machine translation is to translate sentences by using a trained machine learning model. For example, the machine learning model is trained by using a large quantity of translation corpus samples. The translation corpus samples include a correspondence between a plurality of groups of Chinese corpora and English corpora. Each Chinese corpus corresponds to one English corpus that is used as a translation result. After the training is completed, an English translation "The housing prices continued to rise" is outputted after a user inputs a Chinese sentence "房价持续增长" into the machine learning model.

The application scenarios of the machine translation are described by using examples according to a calling manner of the machine learning model.

First: An entry of the machine learning model is visible to the user. For example, the entry of the machine learning model is an input box.

In a possible application scenario, the machine learning model is disposed in an application program, and the application program provides an input box. When the user needs to translate a sentence A, the user may find the input box in the application program and input the sentence A into the input box, and the machine learning model uses the sentence A as a source sentence to be translated. The sentence A may be manually inputted by the user or copied from another text, which is not limited in this embodiment.

In a possible application scenario, the machine learning model is disposed in a server, and a webpage corresponding to the server provides an input box. When the user needs to translate the sentence A, the user may start a browser to open the webpage, find the input box in the webpage, and input the sentence A into the input box. The browser sends the sentence A to the server, and the machine learning model in the server uses the sentence A as a source sentence to be translated. The sentence A may be manually inputted by the user or copied from another text, which is not limited in this embodiment.

Second: An entry of the machine learning model is invisible to the user. For example, the machine learning model is embedded in an application program, or the machine learning model may be called by an application program.

In a possible application scenario, when the user uses the application program to browse text, a sentence A in the text is selected, and in this case, the application program displays operation options for the sentence A. If the operation options include a translation option, when the user triggers the operation option, the application program calls a machine learning model and sends the sentence A to the machine learning model for translation.

2) Human-Machine Dialog

Human-machine dialog refers to a conversation manner of answering, through a computer, a sentence inputted by a user. Generally, the human-machine dialog is to answer sentences by using a trained machine learning model. For example, the machine learning model is trained by using a large quantity of dialog samples, and the dialog samples include a plurality of groups of dialogs in the same natural language or dialogs in different natural languages. After the training is completed, an answer sentence "There are 60 days before the Spring Festival" is outputted after the user inputs a sentence "How many days are there before the Spring Festival" into the machine learning model.

3) Automatic Text Generation

The automatic text generation refers to a text generation manner of writing one sentence or a paragraph of sentences according to a sentence by using a computer. When a word number of the inputted sentence is greater than a word number of the outputted sentence, it may be understood as that content extraction is performed on the inputted sentence, which may be applicable to application scenarios such as abstract extraction; and when the word number of the inputted sentence is less than the word number of the outputted sentence, it may be understood as that content extension is performed on the inputted sentence, which may be applicable to application scenarios such as sentence replication and article generation.

Generally, the automatic text generation is to generate text by using a trained machine learning model. For example, text about sales promotion of flowers is outputted after the user inputs a sentence "Free shipping for flowers this weekend" into the machine learning model.

The second type of application scenarios may include a plurality of application scenarios, and descriptions are made below by using three application scenarios of sentiment analysis, word class analysis, and entity analysis as examples.

1) Sentiment Analysis

The sentiment analysis refers to a classification manner of analyzing user sentiments according to sentences by using a computer. The sentiment herein may include emotions such as sadness and happiness, moods such as depression or tiredness, interpersonal stands such as indifference and alienation, and attitudes such as liking and hatred, which is not limited in this embodiment.

Generally, the sentiment analysis is to analyze sentences by using a trained machine learning model. For example, the machine learning model is trained by using a large quantity of sentiment analysis samples. The sentiment analysis samples include a correspondence between a plurality of groups of sentences and sentiments, and each sentence corresponds to one sentiment. After the training is completed, a classification result "happy" is outputted after the user inputs a sentence "I am happy" into the machine learning model.

2) Word Class Analysis

The word class analysis refers to a classification manner of analyzing word classes of words in a sentence by using a computer. The word class herein may include verbs, nouns, adjectives, prepositions, adverbs, and the like, which is not limited in this embodiment.

Generally, the word class analysis is to analyze sentences by using a trained machine learning model. For example, the machine learning model is trained by using a large quantity of word class analysis samples. The word class analysis samples include a correspondence between a plurality of groups of sentences and word classes, and one word in each sentence corresponds to one word class. After the training is completed, a classification result that "I" belongs to a nouns category, "very" belongs to an adverbs category, and "happy" belongs to an adjectives category is outputted after the user inputs a sentence "I am very happy" into the machine learning model.

3) Name Entity Analysis

The entity analysis refers to a classification manner of extracting name entities in a sentence by using a computer. The name entity herein may include a person's name, a place name, an organization, and the like.

Generally, the name entity analysis is to analyze sentences by using a trained machine learning model. For example, the machine learning model is trained by using a large quantity of name entity analysis samples. The name entity analysis samples include a correspondence between a plurality of groups of sentences and name entities, and one name entity in each sentence corresponds to one name entity. After the training is completed, a classification result "company" is outputted after the user inputs a sentence "I am in a company" into the machine learning model.

The foregoing application scenarios are merely examples. In practice, application scenarios that implementing sentence encoding and decoding by using a machine learning model may all use the methods provided in the embodiments of this application, which is not limited in the embodiments of this disclosure.

In the following, terms involved in this disclosure are briefly introduced.

In some embodiments, the machine learning model may be implemented as a neural network model, a support vector machine (SVM), or a decision tree (DT), which is not limited in the embodiments of this disclosure. In the embodiments of this disclosure, description is made by using an example in which the machine learning model is a recurrent neural network (RNN) model.

Encoding model: a model for encoding a sentence of one natural language into a sentence vector. A sentence vector is formed by word vectors corresponding to all words in a sentence, and the word vector represents a vector of one word in the sentence. A generation manner of the word vector is introduced below, and details are not described herein.

For example, a Chinese sentence "房价持续增长" includes three words "房价", "持续", and "增长", where "房价" corresponds to a word vector 1, "持续" corresponds to a word vector 2, and "增长" corresponds to a word vector 3, and an obtained sentence vector=[word vector 1, word vector 2, word vector 3].

Before a sentence is encoded into a sentence vector, word segmentation operation needs to be performed on the sentence, to obtain at least two words. The word segmentation operation is not limited in this embodiment. The word herein is obtained by performing word segmentation operation on the sentence and may be a character, a word, or a sub-word, which is not limited in this embodiment. The sub-word is obtained by performing word segmentation operation based on a word. For example, a word "Peking university" is divided into two sub-words "Peking" and "university".

Decoding model: a model for decoding a sentence vector into a sentence of one natural language. Each time the decoding model decodes a sentence vector, a word is obtained, and all obtained words form a sentence.

For example, for the sentence vector=[word vector 1, word vector 2, word vector 3], the decoding model performs first decoding on the sentence vector to obtain a word "The", performs second decoding on the sentence vector to obtain a word "housing", and so on, until a word "rise" is obtained after sixth decoding is performed on the sentence vector. The obtained six words form a sentence "The housing prices continued to rise".

The embodiments of this disclosure may be implemented in a terminal, or may be implemented in a server, or may be implemented by a terminal and a server jointly. As shown in FIG. 1, a terminal 11 is configured to generate a source sentence and sends the source sentence to a server 12. After processing the source sentence, the server 12 sends a processing result to the terminal 11 for display. Optionally, the terminal 11 and the server 12 are connected through a communication network, and the communication network may be a wired network or a wireless network, which is not limited in the embodiments of this disclosure.

For example, the server 12 stores a machine learning model used for machine translation. After a user inputs a source sentence "房价持续上涨" that needs to be translated into the terminal 11, the terminal 11 sends the source sentence to the server 12, and the server 12 obtains a target sentence after translating the source sentence by using the machine learning model and sends the target sentence to the terminal 11 for display.

Figure 2:
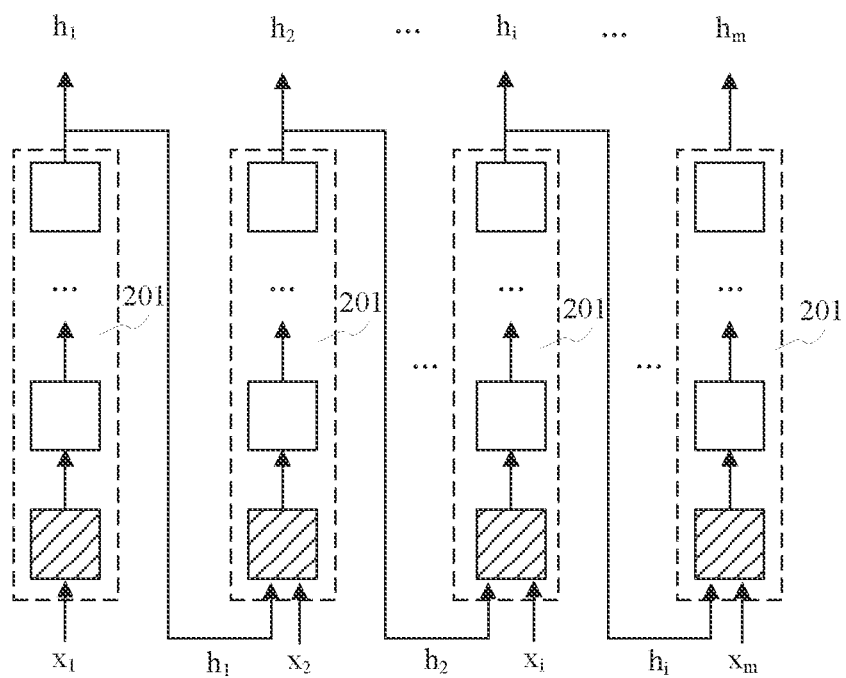
FIG. 2 is a schematic diagram of an encoding model according to some embodiments of this disclosure.

In this disclosure, the machine learning model includes an encoding model and a decoding model, and the following first introduces a structure of the encoding model. Referring to FIG. 2, the encoding model includes n cascaded processing nodes 201, and the processing node 201 includes a first unit and at least one second unit that are cascaded, where the first unit and the first second unit may be cascaded. The processing node 201 may alternatively include a plurality of first units, and the last first unit and the first second unit may be cascaded. In FIG. 2, a shaded box represents the first unit, and a white box represents the second unit, and a sequence of units in each processing node 201 includes: the first unit, the second unit . . . , the second unit, where n≥2.

In a possible implementation, the first unit is a gate recurrent unit (GRU) having a non-linear operation capability and a linear operation capability, such as a linear transformation enhanced GRU (L-GRU) or a GRU performing other linear transformations on the GRU; and the second unit is a transition GRU (T-GRU). The following introduces the GRU, the L-GRU, and the T-GRU respectively.

1) GRU:

A calculation formula of an output of the GRU at an $i^{th}$ moment is:

$h_i = (1-z_i) \text{ e } h_{i-1} + z_i \text{ e } \tilde{h}_i$, where $z_i$ is an update gate of the GRU and a calculation formula is $z_i = \sigma(W_{xz}x_i + W_{hz}h_{i-1})$, $x_i$ is an input of the GRU at the $i^{th}$ moment, $h_{i-1}$ is an output of the GRU at an $(i-1)^{th}$ moment, and $\sigma$ is an activation function; e is a symbol of element-wise multiplication; $\tilde{h}_i$ is a candidate activation function, and a calculation formula is $\tilde{h}_i = \tanh(W_{xh}x_i + r_i \text{ e }(W_{hh}h_{i-1}))$, where tan h is a hyperbolic tangent function; $r_i$ is a reset gate of the GRU, and a calculation formula is $r_i = \sigma(W_{xr}x_i + W_{hr}h_{i-1})$, where $W_{xz}$, $W_{hz}$, $W_{xh}$, $W_{hh}$, $W_{xr}$ and $W_{hr}$ are weights of the GRU and are obtained through training.

The update gate $z_i$ is used for measuring, in $h_i$, a ratio of a portion from $x_i$ and a portion from $h_{i-1}$. A larger value of the update gate $z_i$ indicates a higher proportion from $h_{i-1}$; and a smaller value of the update gate $z_i$ indicates a lower proportion from $h_{i-1}$.

The reset gate $r_i$ is used for measuring, $\tilde{h}_i$, a ratio of a portion from $x_i$ and a portion from $h_{i-1}$. A larger value of the reset gate $r_i$ indicates a lower proportion from $h_{i-1}$; and a smaller value of the reset gate $r_i$ indicates a higher proportion from $h_{i-1}$.

2) T-GRU:

The T-GRU does not exist in the first layer of the machine learning model. Therefore, the input $x_i$ does not exist in the T-GRU.

A calculation formula of an output of the T-GRU at the $i^{th}$ moment is: $h_i=(1-z_i)$ e $h_{i-1}+z_i$ e $\tilde{h}_i$, where $z_i$ is an update gate of the T-GRU and a calculation formula is $z_i=\sigma(W_{hz}h_{i-1})$, $h_{i-1}$ is an output of the T-GRU at the $(i-1)^{th}$ moment, and $\sigma$ is an activation function; e is a symbol of element-wise multiplication; $\tilde{h}_i$ is a candidate activation function, and a calculation formula is $\tilde{h}_i=\tan h(r_i$ e $(W_{hh}h_{i-1}))$, where $\tan h$ is a hyperbolic tangent function; $r_i$ is a reset gate of the T-GRU, and a calculation formula is $r_i=\sigma(W_{hr}h_{i-1})$, where $W_{hz}$, $W_{hh}$, and $W_{hr}$ are weights of the T-GRU and are obtained through training.

The update gate $z_i$ is used for measuring a proportion of $h_i$ from $h_{i-1}$. A larger value of the update gate $z_i$ indicates a higher proportion from $h_{i-1}$; and a smaller value of the update gate $z_i$ indicates a lower proportion from $h_{i-1}$.

The reset gate $r_i$ is used for measuring a proportion of $\tilde{h}_i$ from $h_{i-1}$. A larger value of the reset gate $r_i$ indicates a lower proportion from $h_{i-1}$; and a smaller value of the reset gate $r_i$ indicates a higher proportion from $h_{i-1}$.

3) L-GRU:

A calculation formula of an output of the L-GRU at the $i^{th}$ moment is: $h_i=(1-z_i)$ e $h_{i-1}+z_i$ e $\tilde{h}_i$, where $z_i$ is an update gate of the L-GRU and a calculation formula is $z_i=\sigma(W_{xz}x_i+W_{hz}h_{i-1})$, $x_i$ is an input of the L-GRU at the $i^{th}$ moment, $h_{i-1}$ is an output of the L-GRU at the $(i-1)^{th}$ moment, and $\sigma$ is an activation function; e is a symbol of element-wise multiplication; $\tilde{h}_i$ is a candidate activation function, and a calculation formula is $\tilde{h}_i=\tan h(W_{xh}x_i+r_i$ e $(W_{hh}h_{i-1}))+l_i$ e $H(x_i)$, where $\tan h$ is a hyperbolic tangent function; and $r_i$ is a reset gate of the L-GRU, and a calculation formula is $r_i=\sigma(W_{xr}x_i+W_{hr}h_{i-1})$; H is a linear transformation function and a calculation formula is $H(x_i)=W_xx_i$; $l_i$ is a linear transformation gate of the L-GRU and a calculation formula is $l_i=\sigma(W_{xl}x_i+W_{hl}h_{i-1})$; and $W_{xz}$, $W_{hz}$, $W_{xh}$, $W_{hh}$, $W_{xr}$, $W_{hr}$, $W_x$, $W_{xl}$, and $W_{hl}$ are weights of the L-GRU and are obtained through training.

The update gate $z_i$ is used for measuring, in $h_i$ between a portion from $x_i$ and a portion from $h_{i-1}$. A larger value of the update gate $z_i$ indicates a higher proportion from $h_{i-1}$; and a smaller value of the update gate $z_i$ indicates a lower proportion from $h_{i-1}$.

The reset gate $r_i$ is used for measuring, in $\tilde{h}_i$, a ratio of a portion from $x_i$ and a portion from $h_{i-1}$. A larger value of the reset gate $r_i$ indicates a lower proportion from $h_{i-1}$; and a smaller value of the reset gate $r_i$ indicates a higher proportion from $h_{i-1}$.

The linear transformation gate $l_i$ is used for controlling a candidate activation function value to include a linear transformation function value. In other words, the linear transformation gate $l_i$ is used for enhancing the candidate activation function value so that the candidate activation function value includes a result of the linear transformation for $x_i$ to some extent.

After the structure of the encoding model is made clear, the following introduces a method for encoding a sentence by using the encoding model.

Figure 3:
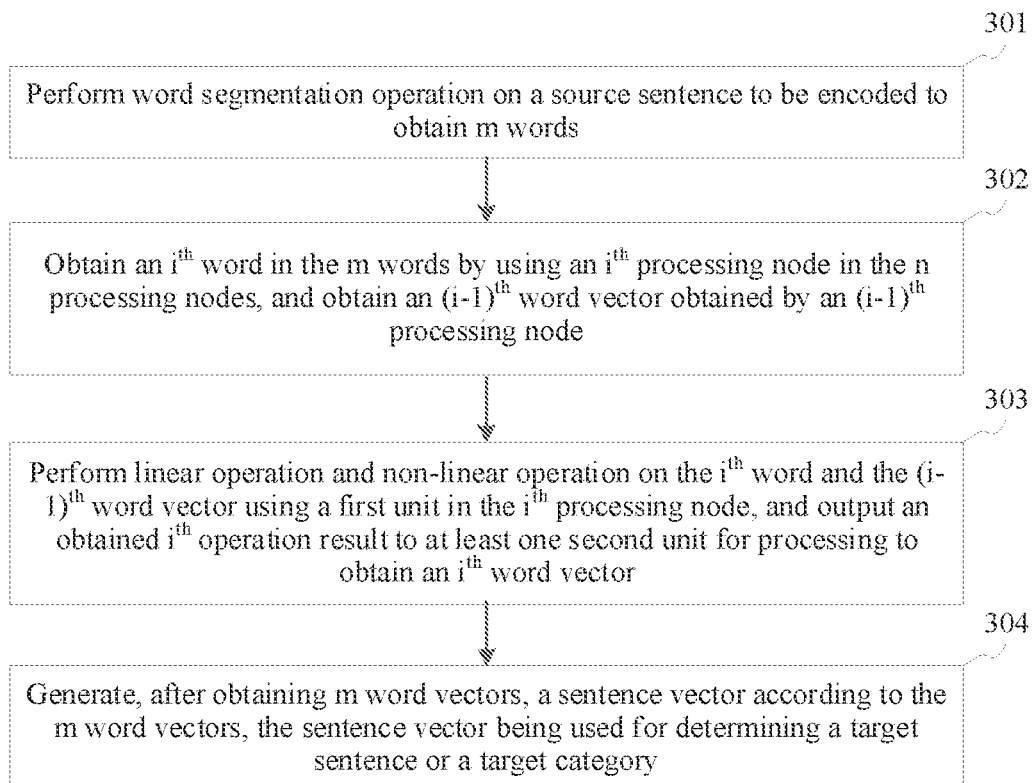
FIG. 3 is a method flowchart of a sentence processing method according to some embodiments of this disclosure.

FIG. 3 is a method flowchart of a sentence processing method according to some embodiments of this disclosure. The sentence processing method includes the following steps:

Step 301. Perform word segmentation operation on a source sentence to be encoded to obtain m words.

The source sentence refers to a sentence corresponding to a natural language. The source sentence may be inputted by the user, or may be selected by the user from text.

Using an example in which the method of this embodiment is applied to an application scenario of machine translation, optionally, the source sentence is a to-be-translated sentence inputted by the user. Optionally, the source sentence may alternatively be selected and generated when the user browses text. For example, after the user selects text content "房价持续上涨" when browsing an article and selects a translation option, the selected text content is the source sentence.

After obtaining the source sentence, the encoding model may perform word segmentation operation on the source sentence. An operation manner of the word segmentation operation is not limited in this embodiment.

In this embodiment, each word in the source sentence corresponds to one processing node, and therefore, a quantity m of the words obtained through word segmentation needs to be less than or equal to a quantity n of the processing nodes in the machine learning model, that is, m≤n.

After obtaining m words, the encoding model may perform step 302 and step 303. After a word vector is obtained, i is updated with i+1, and a next word vector is obtained by continuing to perform step 302 and step 303. The rest may be deduced by analogy, the loop is stopped until i is updated with m to obtain an $m^{th}$ word vector, and step 304 is then performed.

Step 302. Obtain an $i^{th}$ word in the m words by using an $i^{th}$ processing node in the n processing nodes, and obtain an $(i-1)^{th}$ word vector obtained by an $(i-1)^{th}$ processing node, the $(i-1)^{th}$ word vector being an encoding vector of an $(i-1)^{th}$ word in the m words.

After obtaining the m words, the encoding model sorts the m words according to positions of the words in the source sentence. For example, the source sentence is "房价持续增长", and three words after sorting are "房价", "持续", and "增长".

The $(i-1)^{th}$ word vector is generated according to the first $(i-2)$ words in the m words but represents the encoding vector of the $(i-1)^{th}$ word. For example, in FIG. 2, $h_1$ is generated according to the first word and represents the first word vector: and $h_2$ is generated according to the first and second words and represents the second word vector.

Step 303. Perform linear operation and non-linear operation on the $i^{th}$ word and the $(i-1)^{th}$ word vector by using a first unit in the $i^{th}$ processing node, and output an obtained $i^{th}$ operation result to at least one second unit for processing to obtain an $i^{th}$ word vector.

A process in which the encoding model obtains a word vector at each moment is introduced below by using an example in which the first unit is an L-GRU, and the second unit is a T-GRU. In this embodiment, a time from a point at which the processing node receives date to a point at which the processing node outputs data is referred to as a moment, which is also referred to as a time step.

At the first moment, the L-GRU in the first processing node receives the first word $x_1$ in the source sentence, outputs data to the first T-GRU in the first processing node after performing linear operation and non-linear operation on $x_1$ according to the calculation formula. The first T-GRU outputs data to the second T-GRU in the first processing node after processing the received data according to the calculation formula. The rest may be deduced by analogy, until the last T-GRU in the first processing node obtains $h_1$ after processing the received data according to the calculation formula, and $h_1$ is a word vector corresponding to $x_1$.

At the second moment, the L-GRU in the second processing node receives the second word $x_2$ in the source sentence and $h_1$ obtained by the first processing node, outputs data to the first T-GRU in the second processing node after performing linear operation and non-linear operation on $x_2$ and $h_1$ according to the calculation formula. The first T-GRU outputs the data to the second T-GRU in the second processing node after processing the received data according to the calculation formula. The rest may be deduced by analogy, until the last T-GRU in the second processing node obtains $h_2$ after processing the received data according to the calculation formula, and $h_2$ is a word vector corresponding to $x_2$.

By analogy, the $n^{th}$ processing node may obtain $h_m$.

The quantity of the T-GRUs in the processing node may be preset. Generally, the quantity of the T-GRUs and the accuracy of sentence processing are positively correlated, that is, a greater quantity of the T-GRUs indicates higher accuracy of sentence processing. However, as the quantity of the T-GRUs grows, an increase in the accuracy is gradually reduced, and the complexity of the machine learning model is gradually increased, leading to a decrease in the efficiency of sentence processing. Therefore, the quantity of the T-GRUs may be set according to requirements of the user on the accuracy and efficiency of sentence processing.

Step 304. Generate, after obtaining m word vectors, a sentence vector according to the m word vectors, the sentence vector being used for determining a target sentence or a target category.

After obtaining the m word vectors, the encoding model sorts the m word vectors according to positions of the words corresponding to the word vectors in the source sentence. For example, "房价" corresponds to a word vector 1, "持续" corresponds to a word vector 2, and "增长" corresponds to a word vector 3, and an obtained sentence vector=[word vector 1, word vector 2, word vector 3]. After the sentence vector is obtained, the sentence vector may be decoded by using a decoding model to obtain a target sentence or a target category.

When the method of this embodiment is applied to the application scenarios of the first type, the sentence vector is used for the decoding model to generate a target sentence, and the target sentence refers to a sentence corresponding to a natural language. When the method of this embodiment is applied to an application scenario of machine translation, the natural language corresponding to the source sentence and the natural language corresponding to the target sentence are different. For example, the natural language corresponding to the source sentence is Chinese, and the natural language corresponding to the target sentence is English; the natural language corresponding to the source sentence is French, and the natural language corresponding to the target sentence is English; or the natural language corresponding to the source sentence is English, and the natural language corresponding to the target sentence is Chinese. When the method of this embodiment is applied to an application scenario of human-machine dialog or automatic text generation, the natural language corresponding to the source sentence and the natural language corresponding to the target sentence may be the same, or may be different.

When the method of this embodiment is applied to the application scenarios of the second type, the sentence vector is used for determining a target category. When the method of this embodiment is applied to an application scenario of sentiment analysis, the target category is a sentiment category. When the method of this embodiment is applied to an application scenario of word class analysis, the target category is a word class category. When the method of this embodiment is applied to an application scenario of name entity analysis, the target category is a name entity category.

According to the sentence processing method provided in the embodiments of this disclosure, the first unit in the processing node may perform linear operation and non-linear operation on the $i^{th}$ word and the $(i-1)^{th}$ word vector, that is, a word vector of a current word may be determined according to a context. Therefore, a more accurate word vector may be extracted. Further, weights obtained through training are required when the machine learning model processes sentences, while the training involves a back-propagation algorithm, that is, an error between an output and a reference result is transmitted along an output path of training data through back propagation, to facilitate modification of the weights according to the error. However, during back propagation, a gradient of the error in the machine learning model decreases exponentially until disappearing. As a result, front weights in the machine learning model are updated slowly, rear weights are updated quickly, leading to inaccurate weights obtained through training, that is, relatively low accuracy of sentence processing. Therefore, when the encoding model is trained to obtain weights of the encoding model, the first unit outputs data after performing linear operation and non-linear operation on training data. In this way, when the error between the output and the reference result is transmitted through back propagation, the error includes an error of a linear operation part and an error of a non-linear operation part. Since a gradient of the error of the linear operation part is a constant, a decreasing speed of the gradient of the whole error may be reduced, which alleviates the problem that the weights of the encoding model are inaccurate because the gradient of the whole error decreases exponentially until disappearing, thereby improving the accuracy of sentence processing.

In some embodiments, a type of the encoding model may be further set according to an encoding direction of the encoding model, and the following introduces three encoding models.

1. Unidirectional encoding model, where an encoding direction is from front to back.

Referring to FIG. 2, a direction from left to right in FIG. 2 represents the encoding direction of front to back, where a shaded box represents the L-GRU, and a white box represents the T-GRU. In this case, the $i^{th}$ processing node is a processing node 201 arranged at an $i^{th}$ position in the n processing nodes in front-to-back order; and the $i^{th}$ word is a word arranged at an $i^{th}$ position in the m words in front-to-back order.

For example, if the m words obtained by the encoding model are "房价", "持续", and "上涨", in the direction from left to right, the first word processed by the first processing node 201 is "房价", the second word processed by the second processing node 201 is "持续", and the third word processed by the third processing node 201 is "上涨".

2. Unidirectional encoding model, where an encoding direction is from back to front.

Figure 4:
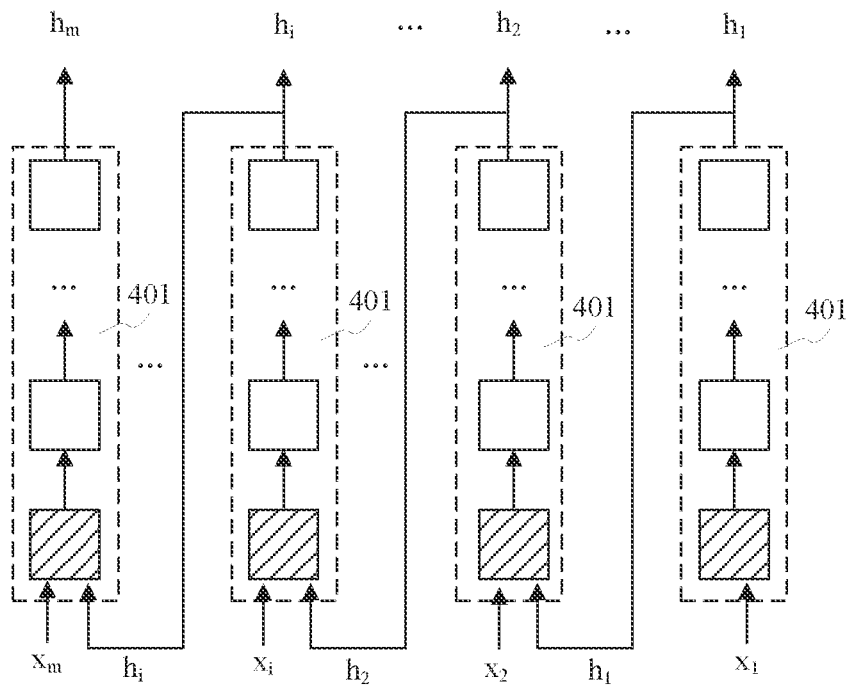
FIG. 4 is a schematic diagram of an encoding model according to some embodiments of this disclosure.

Referring to FIG. 4, a direction from right to left in FIG. 4 represents the encoding direction of back to front, where a shaded box represents the L-GRU, and a white box represents the T-GRU. In this case, the $i^{th}$ processing node is a processing node 401 arranged at an $i^{th}$ position in the n processing nodes in back-to-front order; and the $i^{th}$ word is a word arranged at an $i^{th}$ position in the m words in back-to-front order.

For example, if the m words obtained by the encoding model are "房价", "持续", and "上涨", in the direction from right to left, the first word processed by the first processing node 401 is "上涨", the second word processed by the second processing node 401 is "持续", and the third word processed by the third processing node 401 is "房价".

3. Bidirectional encoding model, where encoding directions are from front to back and from back to front.

Figure 5:
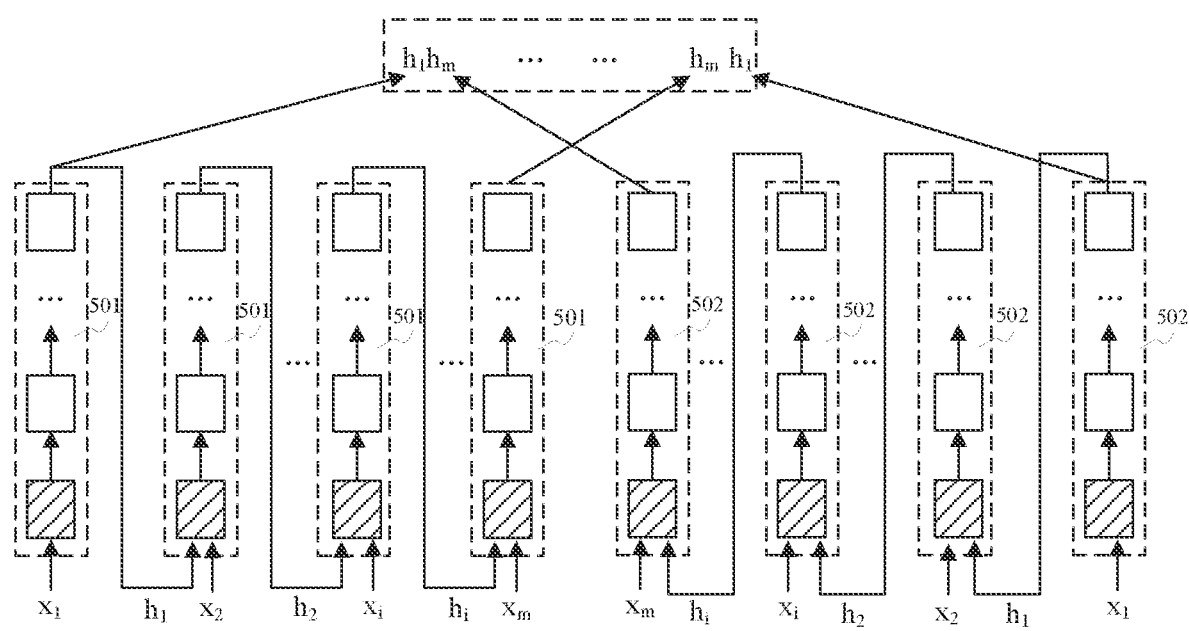
FIG. 5 is a schematic diagram of an encoding model according to some embodiments of this disclosure.

Referring to FIG. 5, in FIG. 5, a direction from left to right represents the encoding direction of front to back, and a direction from right to left represents the encoding direction of back to front, where a shaded box represents the L-GRU, and a white box represents the T-GRU. In this case, the $i^{th}$ processing node includes a processing node 501 arranged at an $i^{th}$ position in the n processing nodes in front-to-back order and a processing node 502 arranged at an it position in the n processing nodes in back-to-front order; and the $i^{th}$ word includes a word arranged at an $i^{th}$ position in the m words in front-to-back order and a word arranged at an $i^{th}$ position in the m words in back-to-front order.

For example, if the m words obtained by the encoding model are "房价", "持续", and "上涨", in the direction from left to right, the first word processed by the first processing node 501 is "房价", the second word processed by the second processing node 501 is "持续", and the third word processed by the third processing node 501 is "上涨"; and in the direction from right to left, the first word processed by the first processing node 502 is "上涨", the second word processed by the second processing node 502 is "持续", and the third word processed by the third processing node 502 is "房价".

Figure 6:
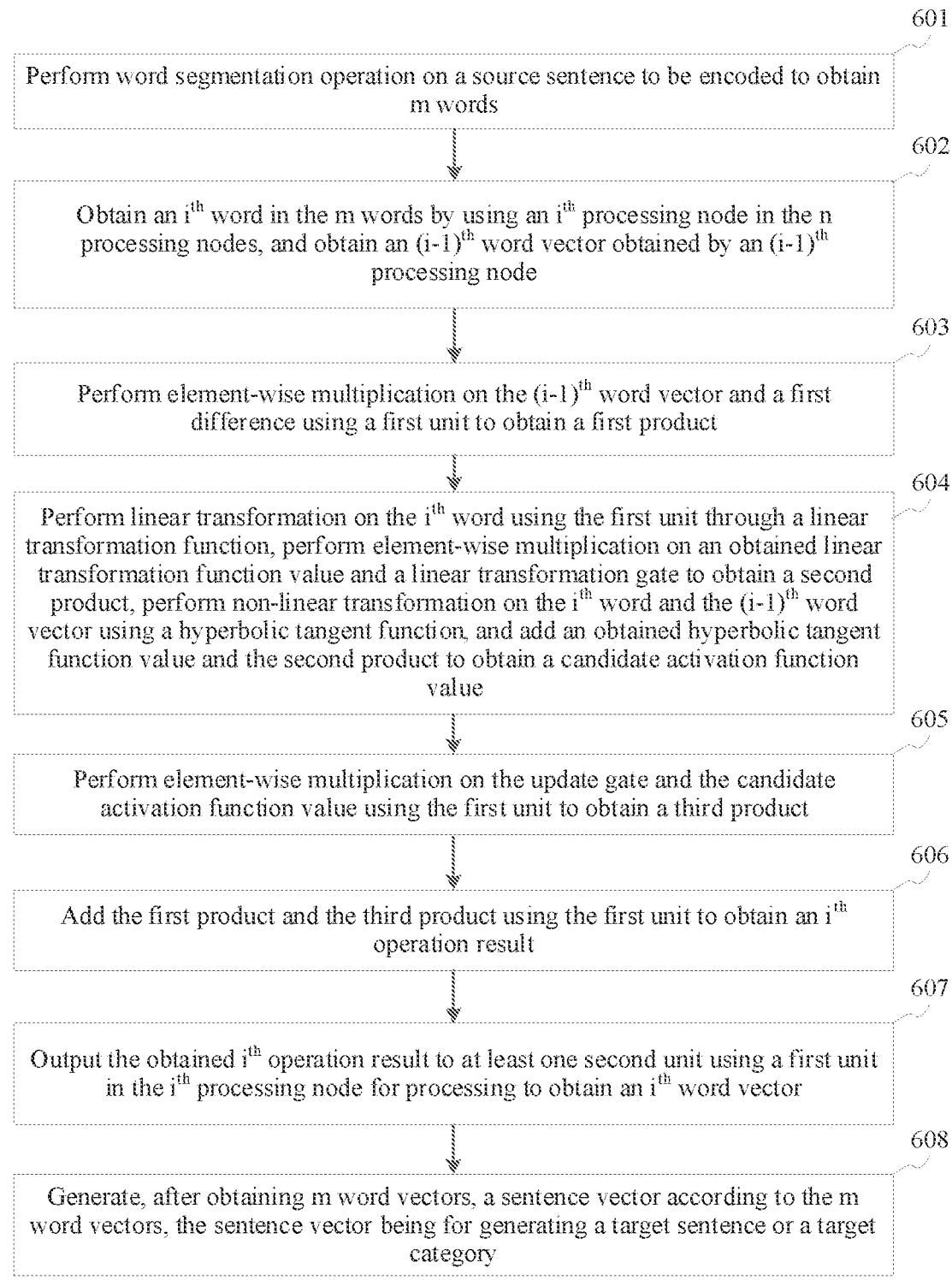
FIG. 6 is a method flowchart of a sentence processing method according to some embodiments of this disclosure.

FIG. 6 is a method flowchart of a sentence processing method according to another embodiment of this disclosure. The sentence processing method includes the following steps:

Step 601. Perform word segmentation operation on a source sentence to be encoded to obtain m words.

After obtaining m words, an encoding model may perform step 602 to step 607. After obtaining a word vector, i is updated with i+1, and a next word vector is obtained by continuing to perform step 602 to step 607. The rest may be deduced by analogy, the loop is stopped until i is updated with m to obtain an $m^{th}$ word vector, and step 608 is then performed.

Step 602. Obtain an $i^{th}$ word in the m words by using an $i^{th}$ processing node in the n processing nodes, and obtain an $(i-1)^{th}$ word vector obtained by an $(i-1)^{th}$ processing node, the $(i-1)^{th}$ word vector being an encoding vector of an $(i-1)^{th}$ word in the m words.

Step 603. Perform element-wise multiplication on the $(i-1)^{th}$ word vector and a first difference by using a first unit to obtain a first product.

The first difference is equal to a value obtained by subtracting an update gate of the first unit from a predetermined value. The predetermined value may be 1 or may be another value, which is not limited in this embodiment.

The update gate is used for measuring, in an $i^{th}$ word vector, a ration between a portion from the $i^{th}$ word and a portion from the $(i-1)^{th}$ word vector. For a calculation formula of the update gate, reference may be made to the description in the L-GRU, and details are not described herein.

Step 604. Perform linear transformation on the $i^{th}$ word by using the first unit through a linear transformation function, and perform element-wise multiplication on an obtained linear transformation function value and a linear transformation gate to obtain a second product; and perform non-linear transformation on the $i^{th}$ word and the $(i-1)^{th}$ word vector by using a hyperbolic tangent function, and add an obtained hyperbolic tangent function value and the second product to obtain a candidate activation function value.

The linear transformation gate is used for controlling the candidate activation function value to include the linear transformation function value. For a calculation formula of the linear transformation gate, reference may be made to the description in the L-GRU, and details are not described herein.

Step 605. Perform element-wise multiplication on the update gate and the candidate activation function value by using the first unit to obtain a third product.

Step 606. Add the first product and the third product by using the first unit to obtain an $i^{th}$ operation result.

The data processing process in step 603 to step 606 is a process in which the L-GRU in one processing node processes data according to the calculation formula. Reference may be made to the calculation formula of the L-GRU described above, and details are not described herein.

Assuming that a depth of the processing node is $l_s$, that is, a total quantity of the L-GRU and the T-GRUs in the processing node is $l_s$, the $i^{th}$ operation result is $h_{\vec{i},0} = $L-GRU$(x_i, h_{i-\vec{1}, l_s})$.

Step 607. Output, by using a first unit in the $i^{th}$ processing node, the obtained $i^{th}$ operation result to at least one second unit for processing to obtain an $i^{th}$ word vector.

The L-GRU in the $i^{th}$ processing node outputs the obtained $i^{th}$ operation result to the first T-GRU in the $i^{th}$ processing node, the first T-GRU in the $i^{th}$ processing node processes the received data and then outputs the data to the second T-GRU in the $i^{th}$ processing node, and the rest may be deduced by analogy, until the last T-GRU in the $i^{th}$ processing node obtains the $i^{th}$ word vector after processing the received data according to the calculation formula, and the $i^{th}$ word vector is a word vector corresponding to the $i^{th}$ word.

Assuming that a depth of the processing node is $l_s$, an output of the $k^{th}$ T-GRU is $h_{i,k}^{\rightarrow} = $T-GRU$_k(h_{i,\rightarrow k-1})$, where $1 \le k \le l_s$.

If the encoding model is a unidirectional encoding model and an encoding direction is from front to back, the $i^{th}$ word vector is $h_{i,\rightarrow l_s}$; if the encoding model is a unidirectional encoding model and an encoding direction is from back to front, the $i^{th}$ word vector is $h_{i,l_s}^{\leftarrow}$; and if the encoding model is a bidirectional encoding model and encoding directions are from front to back and from back to front, the $i^{th}$ word vector is $[h_{i,\rightarrow l_s}, h_{i,l_s}^{\leftarrow}]$, where $\vec{h}_i = h_{i,\rightarrow l_s}$.

Step 608. Generate, after obtaining m word vectors, a sentence vector according to the m word vectors, the sentence vector being used for generating a target sentence, the target sentence and the source sentence corresponding to different natural languages.

Based on the above, according to the sentence processing method provided in the embodiments of this disclosure, the first unit in the processing node may perform linear operation and non-linear operation on the $i^{th}$ word and the $(i-1)^{th}$ word vector. Therefore, when the encoding model is trained to obtain weights of the encoding model, the first unit outputs data after performing linear operation and non-linear operation on training data. In this way, when an error between an output and a reference result is transmitted through back propagation, the error includes an error of a linear operation part and an error of a non-linear operation part. Since a gradient of the error of the linear operation part is a constant, a decreasing speed of the gradient of the whole error may be reduced, which alleviates the problem that the weights of the encoding model are inaccurate because the gradient of the whole error decreases exponentially until disappearing, thereby improving the accuracy of sentence processing.

Figure 7:
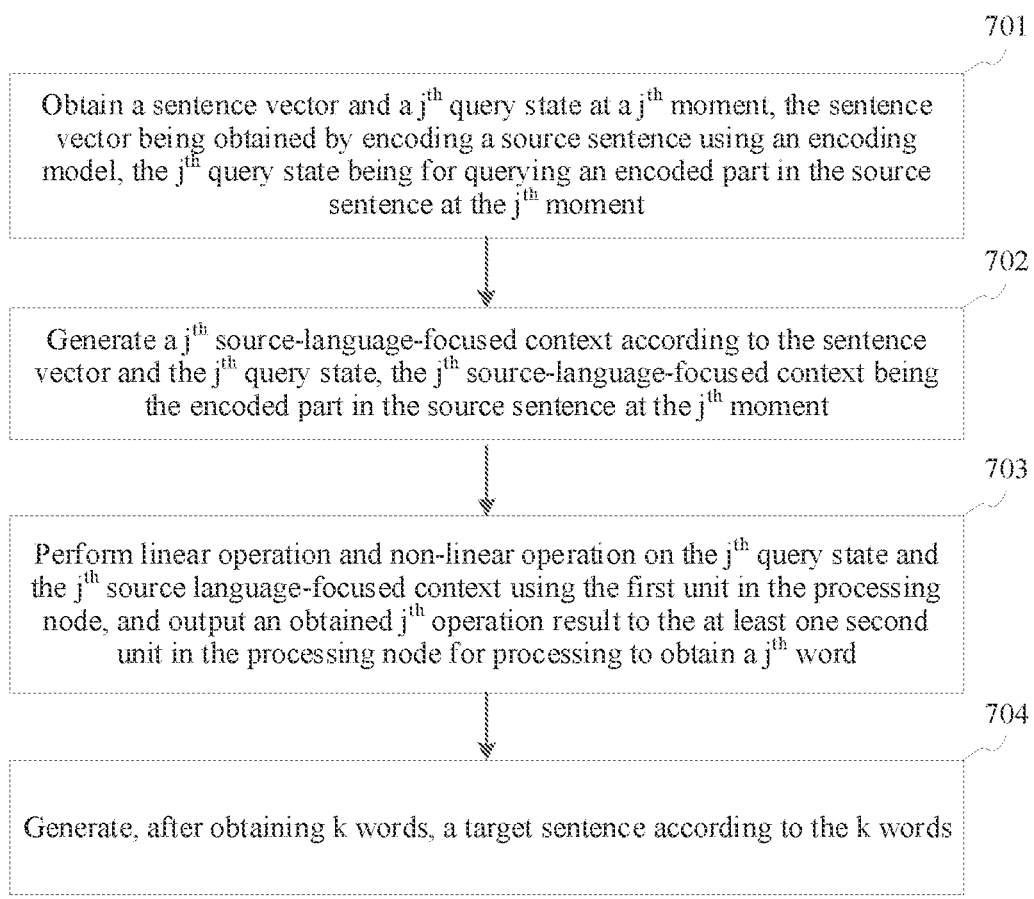
FIG. 7 is a method flowchart of a sentence decoding method according to some embodiments of this disclosure.

FIG. 7 is a method flowchart of a sentence decoding method according to some embodiments of this disclosure. The decoding model includes a processing node, and the processing node includes a first unit and at least one second unit that are cascaded. The first unit is a GRU having a non-linear operation capability and a linear operation capability, such as the L-GRU described above or a GRU performing other linear transformations on the GRU: and the second unit is a T-GRU. The sentence decoding method includes the following steps:

Step 701. Obtain a sentence vector and a $j^{th}$ query state at a $j^{th}$ moment, the sentence vector being obtained after a source sentence to be encoded is encoded by using an encoding model, the $j^{th}$ query state being used for querying an encoded part in the source sentence at the $j^{th}$ moment.

The sentence vector may be generated by the encoding model shown in FIG. 2 to FIG. 6 according to the source sentence, or may be generated by another encoding model according to the source sentence, which is not limited in this embodiment. The source sentence refers to a sentence corresponding to a natural language.

The query state represents a historical state that has been encoded at a current moment, and the query state is used for querying the source sentence to obtain a part that is most likely to be encoded in the source sentence at a next moment, where the part may be a character, a word, a phrase, or discontinuous segments, which is not limited in this embodiment.

Step 702. Generate a $j^{th}$ source-language-focused context according to the sentence vector and the $j^{th}$ query state, the $j^{th}$ source-language-focused context being the encoded part in the source sentence at the $j^{th}$ moment.

The decoding model may perform attention operation on the sentence vector and the $j^{th}$ query state to obtain the $j^{th}$ source-language-focused context. The source-language-focused context is a part that is most likely to be encoded in the source sentence at the current moment, and details are described below.

Step 703. Perform linear operation and non-linear operation on the $j^{th}$ query state and the $j^{th}$ source-language-focused context by using the first unit in the processing node, and output an obtained $j^{th}$ operation result to the at least one second unit in the processing node for processing to obtain a $j^{th}$ word.

When the first unit is an L-GRU and the second unit is a T-GRU, the L-GRU in the processing node may perform linear operation and non-linear operation on the $j^{th}$ query state and the $j^{th}$ source-language-focused context according to the calculation formula introduced above, and output the obtained $j^{th}$ operation result to the first T-GRU in the processing node. The first T-GRU in the processing node processes the received data and then outputs the data to the second T-GRU in the processing node. The rest may be deduced by analogy, until the last T-GRU in the processing node obtains the $j^{th}$ word after processing the received data according to the calculation formula, where the $j^{th}$ word is a word arranged at a $j^{th}$ position in the target sentence in front-to-back order.

Assuming that j≤k, the decoding model may perform step 701 to step 703. After a word is obtained, j is updated with j+1, and a next word is obtained by continuing to perform step 701 to step 703. The rest may be deduced by analogy, the loop is stopped until j is updated with k to obtain a $k^{th}$ word, and step 704 is then performed.

Step 704. Generate, after obtaining k words, a target sentence according to the k words, the target sentence and the source sentence corresponding to different natural languages.

After obtaining the k words, the decoding model sorts the k words according to a generation sequence of the words to obtain the target sentence. For example, if the first word obtained by the decoding model is "The", the second word is "housing", the third word is "prices", the fourth word is "continued", the fifth word is "to", and the sixth word is "rise", the target sentence is "The housing prices continued to rise".

When the method of this embodiment is applied to an application scenario of machine translation, the natural language corresponding to the source sentence and the natural language corresponding to the target sentence are different. For example, the natural language corresponding to the source sentence is Chinese, and the natural language corresponding to the target sentence is English; the natural language corresponding to the source sentence is French, and the natural language corresponding to the target sentence is English; or the natural language corresponding to the source sentence is English, and the natural language corresponding to the target sentence is Chinese.

When the method of this embodiment is applied to an application scenario of human-machine dialog or automatic text generation, the natural language corresponding to the source sentence and the natural language corresponding to the target sentence may be the same, or may be different. This is not limited in this embodiment.

Based on the above, according to the sentence decoding method provided in the embodiments of this disclosure, the first unit in the processing node may perform linear operation and non-linear operation on the $j^{th}$ query state and the $j^{th}$ source-language-focused context. Therefore, when the decoding model is trained to obtain weights of the decoding model, the first unit outputs data after performing linear operation and non-linear operation on training data. In this way, when an error between an output and a reference result is transmitted through back propagation, the error includes an error of a linear operation part and an error of a non-linear operation part. Since a gradient of the error of the linear operation part is a constant, a decreasing speed of the gradient of the whole error may be reduced, which alleviates the problem that the weights of the decoding model are inaccurate because the gradient of the whole error decreases exponentially until disappearing, thereby improving the accuracy of sentence processing.

Figure 8:
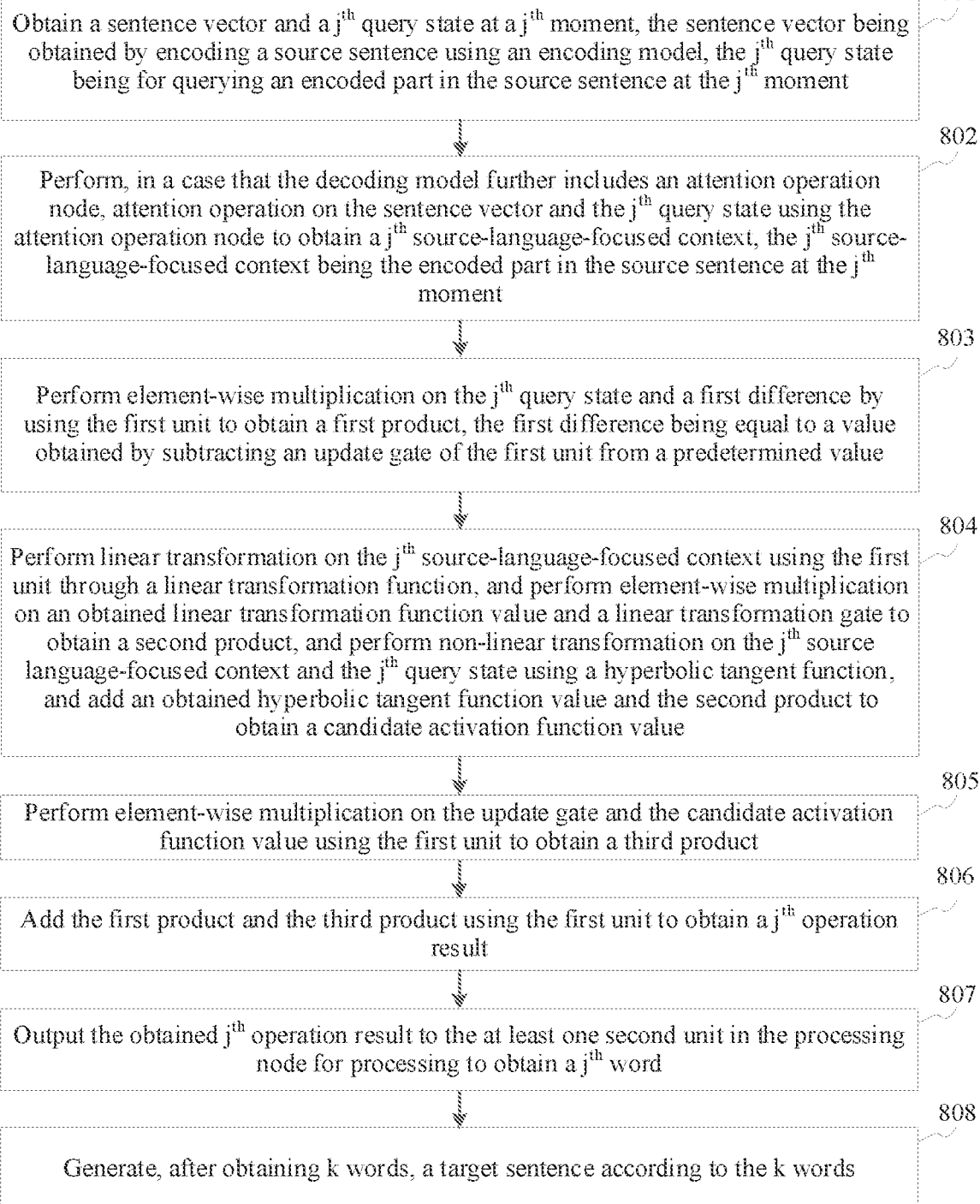
FIG. 8 is a method flowchart of a sentence decoding method according to some embodiments of this disclosure.

FIG. 8 is a method flowchart of a sentence decoding method according to some embodiments of this disclosure. The decoding model includes a processing node, and certainly may alternatively include a plurality of processing nodes, where each processing node includes a first unit and at least one second unit that are cascaded. The first unit is a GRU having a non-linear operation capability and a linear operation capability, such as the L-GRU described above or a GRU performing other linear transformations on the GRU: and the second unit is a T-GRU. The sentence decoding method includes the following steps:

Step 801. Obtain a sentence vector and a $j^{th}$ query state at a $j^{th}$ moment, the sentence vector being obtained after a source sentence to be encoded is encoded by using an encoding model, the $j^{th}$ query state being used for querying an encoded part in the source sentence at the $j^{th}$ moment.

In some embodiments, the decoding model may obtain the $j^{th}$ query state through a query node, and the query node is connected to a processing node. The following describes three implementations of the query node.

In a first implementation, the query node includes a first unit and at least one second unit, and the obtaining a $j^{th}$ query state includes: obtaining a $(j-1)^{th}$ decoded state and a $(j-1)^{th}$ word by using the first unit in the query node, the $(j-1)^{th}$ decoded state being obtained by the processing node according to a $(j-1)^{th}$ operation result, the $(j-1)^{th}$ decoded state being used for determining the $(j-1)^{th}$ word; and performing linear operation and non-linear operation on the $(j-1)^{th}$ decoded state and the $(j-1)^{th}$ word by using the first unit in the query node, and outputting an obtained intermediate operation result to the at least one second unit in the query node for processing to obtain the $j^{th}$ query state.

Figure 9:
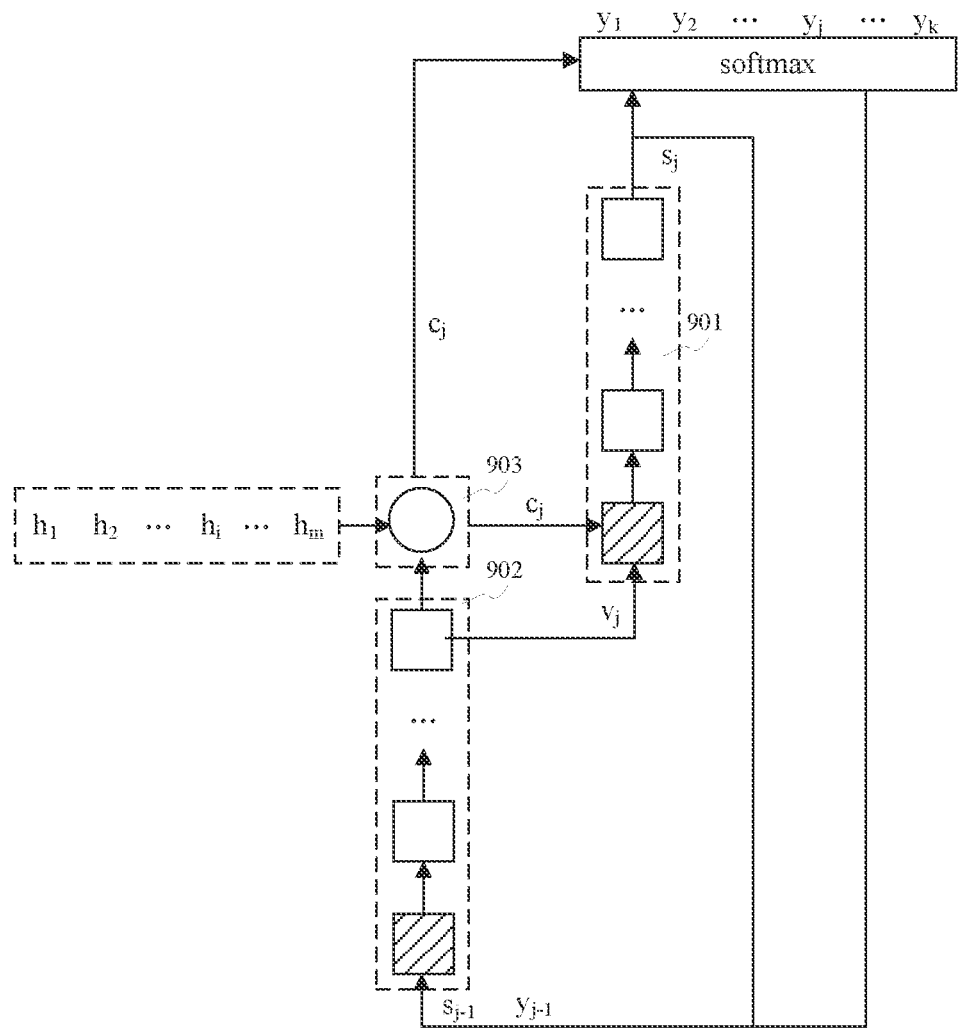
FIG. 9 is a schematic diagram of a decoding model according to some embodiments of this disclosure.

When the first unit is an L-GRU and the second unit is a T-GRU, referring to FIG. 9, the L-GRU is represented by using a shaded box, the T-GRU is represented by using a white box, the processing node is represented by using a dashed line box 901, and the query node is represented by using a dashed line box 902.

The L-GRU in the processing node may perform linear operation and non-linear operation on the $(j-1)^{th}$ decoded state and the $(j-1)^{th}$ word according to the calculation formula introduced above, and output the obtained intermediate operation result to the first T-GRU in the processing node. The first T-GRU in the processing node processes the received data and then outputs the data to the second T-GRU in the processing node. The rest may be deduced by analogy, until the last T-GRU in the processing node obtains the $j^{th}$ query state after processing the received data according to the calculation formula.

Assuming that a depth of the query node is $l_q$ and a depth of the processing node is $l_d$, that is, a total quantity of the L-GRU and the T-GRUs in the query node is $l_q$ and a total quantity of the L-GRU and the T-GRUs in the processing node is $l_d$, the intermediate operation result is $s_{j,0}$=L-GRU $(y_{j-1}, s_{j-1, l_q+l_d+1})$, an operation result of a $k^{th}$ T-GRU is $s_{j,k}$=T-GRU$_k$ $(s_{j, k-1})$, and $1 \leq k \leq lq$. s represents a decoded state, and y represents a word in the target sentence.

Compared with a case that the query node includes one GRU, in this disclosure, the depth of the query node is increased, that is, T-GRUs are added to the query node, thereby improving the learning capability of the decoding model; moreover, the GRU is modified to be the L-GRU, so that the accuracy of the weights of the decoding model is improved, thereby improving the accuracy of sentence processing.

In a second implementation, the query node includes a first unit, and the obtaining a $j^{th}$ query state includes: obtaining a $(j-1)^{th}$ decoded state and a $(j-1)^{th}$ word by using the first unit in the query node, the $(j-1)^{th}$ decoded state being obtained by the processing node according to a $(j-1)^{th}$ operation result, the $(j-1)^{th}$ decoded state being used for determining the $(j-1)^{th}$ word; and performing linear operation and non-linear operation on the $(j-1)^{th}$ decoded state and the $(j-1)^{th}$ word by using the first unit in the query node to obtain the $j^{th}$ query state.

Figure 10:
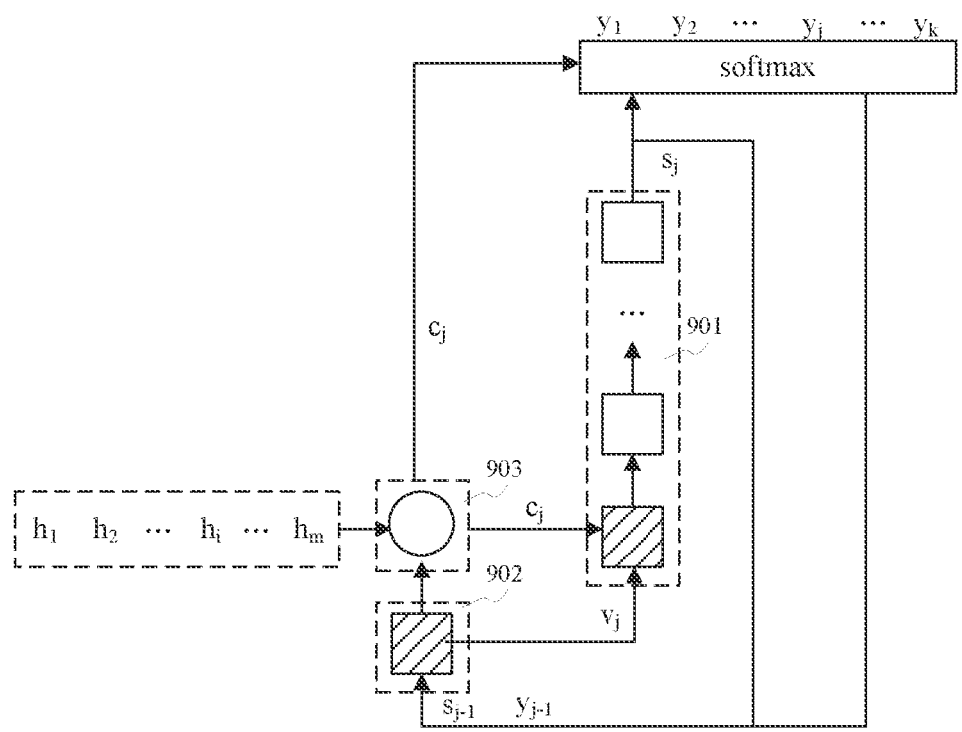
FIG. 10 is a schematic diagram of a decoding model according to some embodiments of this disclosure.

When the first unit is an L-GRU, referring to FIG. 10, the L-GRU is represented by using a shaded box, the T-GRU is represented by using a white box, the processing node is represented by using a dashed line box 901, and the query node is represented by using a dashed line box 902.

The L-GRU in the processing node may perform linear operation and non-linear operation on the $(j-1)^{th}$ decoded state and the $(j-1)^{th}$ word according to the calculation formula introduced above to directly obtain the $j^{th}$ query state.

Compared with a case that the query node includes one GRU, in this disclosure, the GRU is modified to be the L-GRU, so that the accuracy of the weights of the decoding model is improved, thereby improving the accuracy of sentence processing.

In a third implementation, the query node includes a third unit and at least one second unit, and the obtaining a $j^{th}$ query state includes: obtaining a $(j-1)^{th}$ decoded state and a $(j-1)^{th}$ word by using the third unit in the query node, the $(j-1)^{th}$ decoded state being obtained by the processing node according to a $(j-1)^{th}$ operation result, the $(j-1)^{th}$ decoded state being used for determining the $(j-1)^{th}$ word; and performing linear operation and non-linear operation on the $(j-1)^{th}$ decoded state and the $(j-1)^{th}$ word by using the third unit in the query node, and outputting an obtained intermediate operation result to the at least one second unit in the query node for processing to obtain the $j^{th}$ query state.

Figure 11:
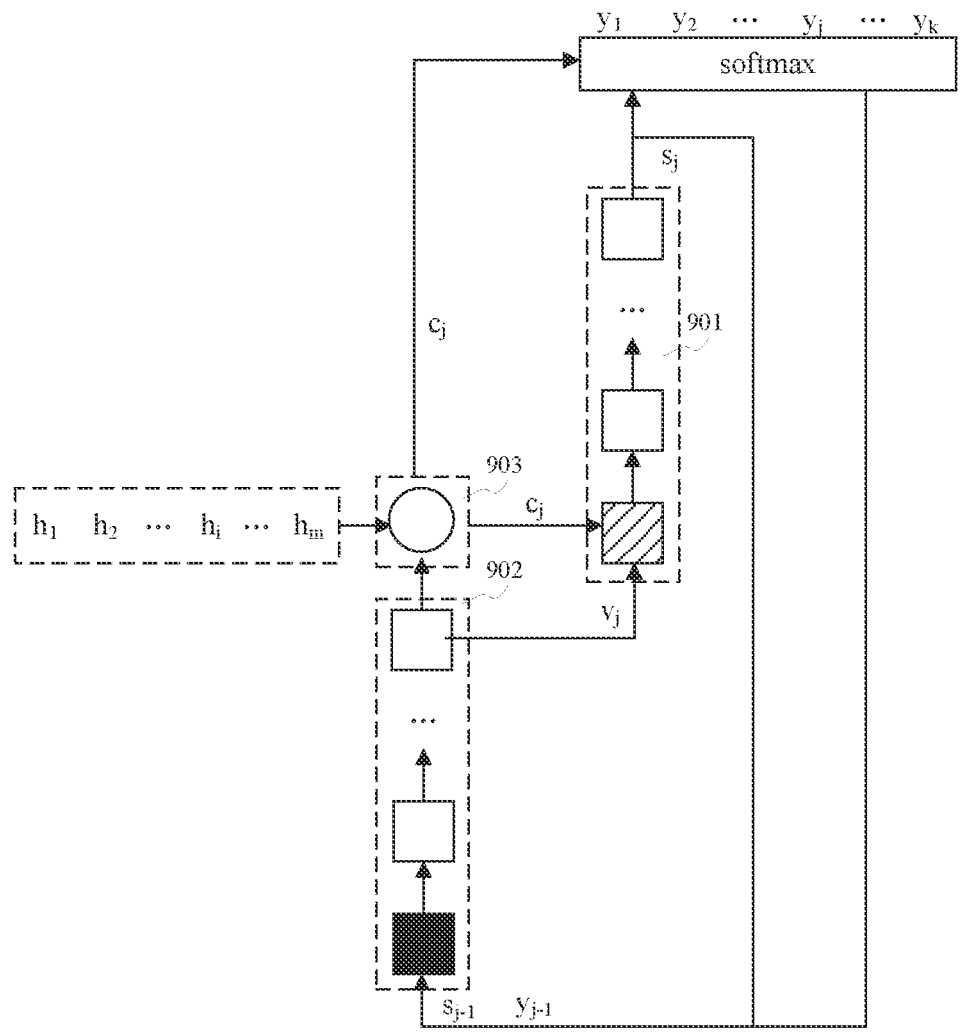
FIG. 11 is a schematic diagram of a decoding model according to some embodiments of this disclosure.

When the third unit is an GRU and the second unit is a T-GRU, referring to FIG. 11, the GRU is represented by using a black box, the T-GRU is represented by using a white box, the processing node is represented by using a dashed line box 901, and the query node is represented by using a dashed line box 902.

The GRU in the processing node may perform non-linear operation on the $(j-1)^{th}$ decoded state and the $(j-1)^{th}$ word according to the calculation formula introduced above, and output the obtained intermediate operation result to the first T-GRU in the processing node. The first T-GRU in the processing node processes the received data and then outputs the data to the second T-GRU in the processing node. The rest may be deduced by analogy, until the last T-GRU in the processing node obtains the $j^{th}$ query state after processing the received data according to the calculation formula.

Compared with a case that the query node includes one GRU, in this disclosure, the depth of the query node is increased, that is, T-GRUs are added to the query node, thereby improving the learning capability of the decoding model.

Step 802. Perform, in a case that the decoding model further includes an attention operation node, attention operation on the sentence vector and the $j^{th}$ query state by using the attention operation node to obtain a $j^{th}$ source-language-focused context, the $j^{th}$ source-language-focused context being the encoded part in the source sentence at the $j^{th}$ moment.

The attention operation node is connected to the encoding model, the query node, and the processing node. For details, referring to FIG. 9 to FIG. 11, the attention operation node is represented by using a dashed line box 903.

In some embodiments, the attention operation node in this disclosure may be a multi-attention operation model, or may be another attention model, such as a conventional attention calculation model, a local attention model, or a global attention model, which is not limited in this embodiment.

Using the multi-attention operation model as an example, the $j^{th}$ source-language-focused context $c_j$=Multihead-Attention (C, $v_{j, l_q}$), where C is a sentence vector, and v is a query state.

Step 803. Perform element-wise multiplication on the $j^{th}$ query state and a first difference by using the first unit to obtain a first product, the first difference being equal to a value obtained by subtracting an update gate of the first unit from a predetermined value.

The first difference is equal to a value obtained by subtracting an update gate of the first unit from a predetermined value, the predetermined value may be 1 or may be another value, which is not limited in this embodiment.

The update gate is used for measuring, in a $j^{th}$ source-language-focused context vector, a ratio of a portion from the $j^{th}$ source-language-focused context and a portion from the $j^{th}$ query state. For a calculation formula of the update gate, reference may be made to the description in the L-GRU, and details are not described herein.

Step 804. Perform linear transformation on the $j^{th}$ source-language-focused context by using the first unit through a linear transformation function, and perform element-wise multiplication on an obtained linear transformation function value and a linear transformation gate to obtain a second product; and perform non-linear transformation on the $j^{th}$ source-language-focused context and the $j^{th}$ query state by using a hyperbolic tangent function, and add an obtained hyperbolic tangent function value and the second product to obtain a candidate activation function value.

The linear transformation gate is used for controlling the candidate activation function value to include the linear transformation function value. For a calculation formula of the linear transformation gate, reference may be made to the description in the L-GRU, and details are not described herein.

Step 805. Perform element-wise multiplication on the update gate and the candidate activation function value by using the first unit to obtain a third product.

Step 806. Add the first product and the third product by using the first unit to obtain a $j^{th}$ operation result.

A data processing process in step 803 to step 807 is a process in which the L-GRU in the processing node processes data according to the calculation formula and is simply represented as $s_{j, l_q+1}$=L-GRU ($c_j$, $v_{j, l_d}$), and details are not described herein. c is a source-language-focused context, and v is a query state.

Step 807. Output the obtained $j^{th}$ operation result to the at least one second unit in the processing node for processing to obtain a $j^{th}$ word.

The L-GRU in the processing node outputs the obtained $j^{th}$ operation result to the first T-GRU in the processing node. The first T-GRU in the processing node outputs processes the received data and then outputs the data to the second T-GRU in the processing node. The rest may be deduced by analogy, until the last T-GRU in the processing node obtains the $j^{th}$ word after processing the received data according to the calculation formula, where the $j^{th}$ word is a word arranged at a $j^{th}$ position in the target sentence in front-to-back order.

If represented by using a formula, an output of the T-GRU is $s_{j, l_q+p}$=T-GRU ($v_{j, l_q+p-1}$), where $2 \le p \le l_{d+1}$.

First, after generating a $j^{th}$ decoded state, the decoding model further obtains the $(j-1)^{th}$ word, the $j^{th}$ decoded state, and the $j^{th}$ source-language-focused context, and outputs a vector $o_j$ according to the foregoing three pieces of data, where a calculation formula is $o_j$=tan h ($W_y^o y_{j-1} + W_s^o s_j + W_c^o c_j$), $W_y^o$, $W_s^o$, and $W_c^o$ are weights of the decoding model and are obtained through training; and $s_j = s_{j, l_q+l_d+1}$. The decoding model then obtains the outputted vector $o_j$ through softmax, calculates probabilities of the $j^{th}$ word being words in a word list according to a calculation formula $y_j$=soft max ($W_o$+b), and uses a word corresponding to the greatest probability as the $j^{th}$ word. The word list is preset in the decoding model.

Second, assuming that $j \le k$, the decoding model may perform step 801 to step 807. After obtaining a word, j is updated with j+1, and a next word is obtained by continuing to perform step 801 to step 807. The rest may be deduced by analogy, the loop is stopped until j is updated with k to obtain a $k^{th}$ word, and step 808 is then performed. A process in which the decoding model obtains a word vector at each moment is introduced below. In this embodiment, a time from a point at which the processing node receives date to a point at which the softmax (a normalized function) outputs data is referred to as a moment, which is also referred to as a time step.

At the first moment, the query node obtains an initial query state and an initial word, and obtains a first query state $v_1$ after processing the initial query state and the initial word according to a calculation formula; the attention operation node obtains a sentence vector and $v_1$, and obtains a first source-language-focused context $c_1$ after processing the sentence vector and the $v_1$ according to the calculation formula; the L-GRU in the processing node obtains $v_1$ and $c_1$, and outputs $v_1$ and $c_1$ to the first T-GRU in the processing node after performing linear operation and non-linear operation on $v_1$ and $c_1$ according to the calculation formula; the first T-GRU in the processing node processes the received data according to the calculation formula and then outputs the data to the second T-GRU in the processing node. The rest may be deduced by analogy, until the last T-GRU in the processing node obtains the first decoded state $s_1$ after processing the received data according to the calculation formula and the softmax obtains $c_1$ and $s_1$, and obtains the first word $y_1$ after processing $c_1$ and the $s_1$ according to the calculation formula.

At the second moment, the query node obtains $v_1$ and $y_1$, and obtains a second query state $v_2$ after processing $v_1$ and $y_1$; subsequent processing procedure is the same as that of the first moment, and the second word $y_2$ is finally obtained.

By analogy, the decoding model may obtain a $k^{th}$ word $y_k$, and a sentence finally obtained by the decoding model is $y_1$ $y_2 \ldots y_i \ldots y_k$.

Step 808. Generate, after obtaining k words, a target sentence according to the k words.

After obtaining the k words, the decoding model sorts the k words according to a generation sequence of the words to obtain the target sentence. For example, if the first word obtained by the decoding model is "The", the second word is "housing", the third word is "prices", the fourth word is "continued", the fifth word is "to", and the sixth word is "rise", the target sentence is "The housing prices continued to rise".

When the method of this embodiment is applied to an application scenario of machine translation, the natural language corresponding to the source sentence and the natural language corresponding to the target sentence are different. For example, the natural language corresponding to the source sentence is Chinese, and the natural language corresponding to the target sentence is English; the natural language corresponding to the source sentence is French, and the natural language corresponding to the target sentence is English; or the natural language corresponding to the source sentence is English, and the natural language corresponding to the target sentence is Chinese. When the method of this embodiment is applied to an application scenario of human-machine dialog or automatic text generation, the natural language corresponding to the source sentence and the natural language corresponding to the target sentence may be the same, or may be different. This is not limited in this embodiment.

Based on the above, according to the sentence decoding method provided in the embodiments of this disclosure, the first unit in the processing node may perform linear operation and non-linear operation on the $j^{th}$ query state and the $j^{th}$ source-language-focused context. Therefore, when the decoding model is trained to obtain weights of the decoding model, the first unit outputs data after performing linear operation and non-linear operation on training data. In this way, when an error between an output and a reference result is transmitted through back propagation, the error includes an error of a linear operation part and an error of a non-linear operation part. Since a gradient of the error of the linear operation part is a constant, a decreasing speed of the gradient of the whole error may be reduced, which alleviates the problem that the weights of the decoding model are inaccurate because the gradient of the whole error decreases exponentially until disappearing, thereby improving the accuracy of sentence processing.

Compared with a case that the query node includes one GRU, in this disclosure, the depth of the query node is increased, and the depth of the query node may be increased by using at least one of the following manners: adding T-GRUs to the query node to improve the learning capability of the decoding model; or modifying the GRU to be an L-GRU, so that the accuracy of weights of the decoding model is improved, thereby improving the accuracy of sentence processing.

In this disclosure, not only non-linear operation is performed on data by using a hyperbolic tangent function to ensure the learning capability of the machine learning model, but also linear operation is performed on data by using a linear transformation function. In this way, an error of back propagation includes errors of a linear operation part and a non-linear operation part. Since a gradient of the error of the linear operation part is a constant, a decreasing speed of the gradient of the whole error may be slowed, and a problem of the inaccurate weight of the decoding model since the gradient of the whole error is deceased exponentially until disappears is solved, thereby improving the accuracy of sentence processing.

Figure 12:
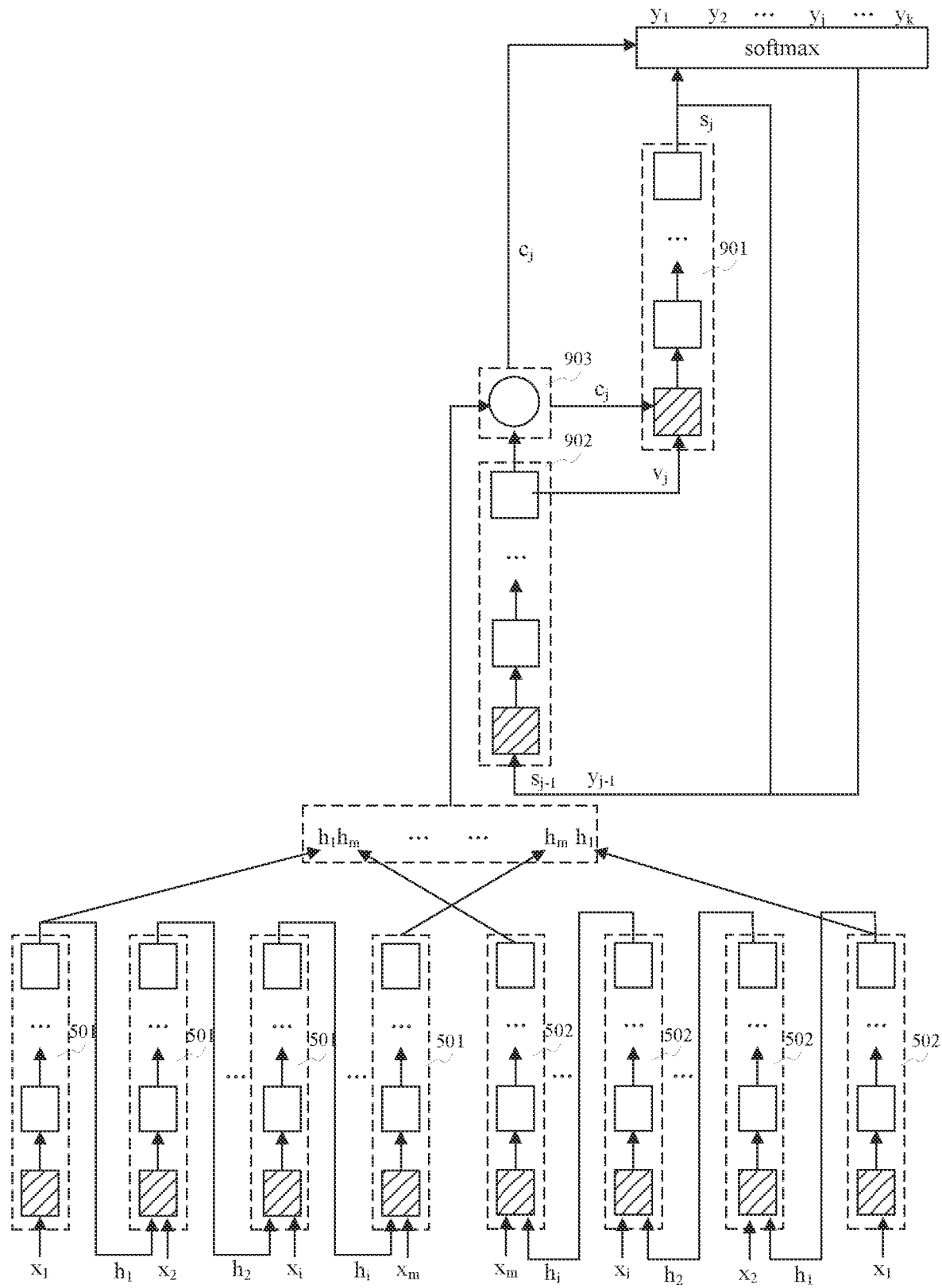
FIG. 12 is a schematic diagram of a decoding model and a decoding model according to some embodiments of this disclosure.

In some embodiments, in this disclosure, the foregoing encoding model and the decoding model may be combined to obtain a machine learning model having encoding and decoding capabilities. That is, any encoding model in FIG. 2, FIG. 4, and FIG. 5 is combined with any decoding model in FIG. 9 to FIG. 11. Referring to FIG. 12, in FIG. 12, description is made by using an example in which the encoding model is a bidirectional encoding model and a query node in the decoding model includes a first unit and at least one second unit.

Still using the example in which the source sentence is "房价持续增长" and the machine learning model is applied to an application scenario of machine translation, the encoding model in the machine learning model shown in FIG. 12 first performs word segmentation on the source sentence, to obtain three words "房价", "持续", and "增长"; processes the three words by using the first three processing nodes respectively according to an encoding direction from front to back, to obtain a word vector 1 corresponding to "房价", a word vector 2 corresponding to "持续", and a word vector 3 corresponding to "增长" sequentially; and processes the three words by using the last three processing nodes respectively according to an encoding direction from back to front, to obtain a word vector 4 corresponding to "增长", a word vector 5 corresponding to "持续", and a word vector 6 corresponding to "房价" sequentially. As a result, an obtained sentence vector is [word vector 1 word vector 6, word vector 2 word vector 5, word vector 3 word vector 4], and the sentence vector is outputted to the decoding model.

The decoding model decodes the sentence vector by using the foregoing decoding method, obtains a word "The" during the first decoding, obtains a word "housing" during the second decoding, obtains a word "prices" during the third decoding, obtains a word "continued" during the fourth decoding, obtains a word "to" during the fifth decoding, and obtains a word "rise" during the sixth decoding. In this case, the target sentence is "The housing prices continued to rise".

When the machine learning model includes the foregoing encoding model and decoding model, the quantity of the T-GRUs in the processing node of the encoding model, the quantity of the T-GRUs in the processing node of the decoding model, and the quantity of the T-GRUs in the query node of the decoding model may be the same or may be different.

The following evaluates a bilingual evaluation understudy (BLEU) indicator of machine translation by using an example in which the three nodes include the same quantity of T-GRUs, and the quantity is 1 or 4. Related evaluation data is shown in Table 1. The BLEU indicator is used for evaluating a machine translation effect, and a higher BLEU indicator indicates a better machine translation effect.

TABLE 1

| Machine learning model | Chinese-English | English-German | English-French |
| --- | --- | --- | --- |
| Criterion | 41.57 | 25.66 | 39.28 |
| This disclosure (L-GRU + 1 T-GRU) | 44.41 (+2.84) | 27.92 (+2.26) | 40.75 (+1.47) |
| This disclosure (L-GRU + 4 T-GRU) | 45.04 (+3.47) | 28.70 (+3.04) | 42.02 (+2.74) |

In Table 1, an increment of this disclosure relative to a standard machine learning model is marked in the brackets of the BLEU indicator. Generally, it may be considered that the machine translation effect is remarkably improved when the increment exceeds 1. Therefore, this disclosure may remarkably improve the machine translation effect.

The following evaluates the BLEU indicator of machine translation by using an example in which the foregoing three nodes are all GRU+1 T-GRU, L-GRU+1 T-GRU, GRU+4 T-GRU, or L-GRU+4 T-GRU, and related evaluation data is shown in Table 2.

TABLE 2

| Machine learning model | Chinese-English |
| --- | --- |
| GRU + 1 T-GRU | 43.63 |
| L-GRU + 1 T-GRU | 44.41 |
| GRU + 4 T-GRU | 44.16 |
| L-GRU + 4 T-GRU | 45.04 |

It may be known by analyzing the BLEU indicators in Table 2 that:

1) When the three nodes are all L-GRU+1 T-GRU, compared with a case that the three nodes are all GRU+1 T-GRU, the BLEU indicator is increased by 44.41−43.63=0.78; and when the three nodes are all L-GRU+4 T-GRU, compared with a case that the three nodes are all GRU+4 T-GRU, the BLEU indicator is increased by 45.04−44.16=0.88. Therefore, the accuracy of machine translation may be improved by modifying GRUs in the nodes to be L-GRUs.

2) When the three nodes are all GRU+1 T-GRU, compared with a case that the three nodes are all GRU+4 T-GRU, the BLEU indicator is increased by 44.16−43.63=0.53; and when the three nodes are all L-GRU+1 T-GRU, compared with a case that the three nodes are all L-GRU+4 T-GRU, the BLEU indicator is increased by 45.04−44.41=0.63. Therefore, the accuracy of machine translation may be improved by increasing the quantity of T-GRUs in the nodes.

The following evaluates the BLEU indicator of machine translation by using an example in which the foregoing three nodes are one of L-GRU+4 T-GRU and GRU, and related evaluation data is shown in Table 3. √ indicates that a corresponding node is L-GRU+4 T-GRU, and x indicates that a corresponding node is GRU.

TABLE 3

Model ablation experiment (L-GRU + 4 T-GRU)

| Processing node of encoding model | Query node of decoding model | Processing node of decoding model | Chinese-English |
|---|---|---|---|
| ✓ | ✓ | ✓ | 45.04 |
| x | ✓ | ✓ | 43.30 |
| ✓ | x | ✓ | 44.35 |
| ✓ | ✓ | x | 44.36 |

It may be known from the BLEU indicators in Table 3 that, when the three nodes in the machine learning model are all L-GRU+4 T-GRU, the BLEU indicator is the highest. Therefore, when the three nodes are all L-GRU+4 T-GRU, the machine translation effect of the machine learning model is the best.

It is to be understood that, the steps of the embodiments of this disclosure are not necessarily performed according to a sequence indicated by step numbers. Unless explicitly specified in this disclosure, the sequence of the steps is not strictly limited, and the steps may be performed in other sequences. Moreover, at least some of the steps in the embodiments may include a plurality of sub-steps or a plurality of stages. The sub-steps or stages are not necessarily performed at the same moment but may be performed at different moments. The sub-steps or stages are not necessarily performed sequentially, but may be performed in turn or alternately with other steps or at least some sub-steps or stages of other steps.

Figure 13:
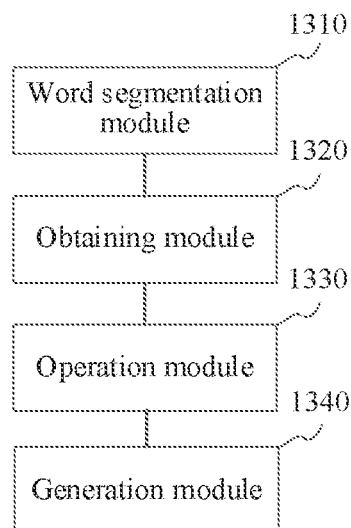
FIG. 13 is a structural block diagram of a sentence processing apparatus according to some embodiments of this disclosure.

FIG. 13 is a structural block diagram of a sentence processing apparatus according to some embodiments of this disclosure. The sentence processing apparatus is applicable to an encoding model, the encoding model includes n cascaded processing nodes, the processing node includes a first unit and at least one second unit that are cascaded, and n≥2. The sentence processing apparatus includes:

a word segmentation module 1310, configured to perform word segmentation operation on a source sentence to be encoded to obtain m words, m≤n;

an obtaining module 1320, configured to obtain an $i^{th}$ word in the m words by using an $i^{th}$ processing node in the n processing nodes, and obtain an $(i-1)^{th}$ word vector obtained by an $(i-1)^{th}$ processing node, the $(i-1)^{th}$ word vector being an encoding vector of an $(i-1)^{th}$ word in the m words, i≤m;

an operation module 1330, configured to perform linear operation and non-linear operation on the $i^{th}$ word and the $(i-1)^{th}$ word vector by using the first unit in the $i^{th}$ processing node, and output an obtained $i^{th}$ operation result to the at least one second unit for processing to obtain an $i^{th}$ word vector; and a generation module 1340, configured to generate, after obtaining m word vectors, a sentence vector according to the m word vectors, the sentence vector being used for determining a target sentence or a target category.

In a possible implementation, when the encoding model is a unidirectional encoding model and an encoding direction is from front to back, the $i^{th}$ processing node is a processing node arranged at an $i^{th}$ position in the n processing nodes in front-to-back order; and the $i^{th}$ word is a word arranged at an $i^{th}$ position in the m words in front-to-back order.

In a possible implementation, when the encoding model is a unidirectional encoding model and an encoding direction is from back to front, the $i^{th}$ processing node is a processing node arranged at an $i^{th}$ position in the n processing nodes in back-to-front order; and the $i^{th}$ word is a word arranged at an $i^{th}$ position in the m words according to the sequence from back to front.

In a possible implementation, when the encoding model is a bidirectional encoding model and encoding directions are from front to back and from back to front, and m≤n/2;

the $i^{th}$ processing node includes a processing node arranged at an $i^{th}$ position in the n processing nodes in front-to-back order and a processing node arranged at an $i^{th}$ position in the n processing nodes in back-to-front order; and the $i^{th}$ word includes a word arranged at an $i^{th}$ position in the m words in front-to-back order and a word arranged at an $i^{th}$ position in the m words in back-to-front order.

In a possible implementation, the operation module 1330 is further configured to:

perform element-wise multiplication on the $(i-1)^{th}$ word vector and a first difference by using the first unit to obtain a first product, where the first difference is equal to a value obtained by subtracting an update gate of the first unit from a predetermined value, and the update gate is used for measuring, in the $i^{th}$ word vector, a ratio of a portion from the $i^{th}$ word and a portion from the $(i-1)^{th}$ word vector;

perform linear transformation on the $i^{th}$ word by using the first unit through a linear transformation function, and perform element-wise multiplication on an obtained linear transformation function value and a linear transformation gate to obtain a second product; and perform non-linear transformation on the $i^{th}$ word and the $(i-1)^{th}$ word vector by using a hyperbolic tangent function, and add an obtained hyperbolic tangent function value and the second product to obtain a candidate activation function value, where the linear transformation gate is used for controlling the candidate activation function value to include the linear transformation function value;

perform element-wise multiplication on the update gate and the candidate activation function value by using the first unit to obtain a third product; and add the first product and the third product by using the first unit to obtain the $i^{th}$ operation result.

Based on the above, according to the sentence processing apparatus provided in the embodiments of this disclosure, the first unit in the processing node may perform linear operation and non-linear operation on the $i^{th}$ word and the $(i-1)^{th}$ word vector. Therefore, when the encoding model is trained to obtain weights of the encoding model, the first unit outputs data after performing linear operation and non-linear operation on training data. In this way, when an error between an output and a reference result is transmitted through back propagation, the error includes an error of a linear operation part and an error of a non-linear operation part. Since a gradient of the error of the linear operation part is a constant, a decreasing speed of the gradient of the whole error may be reduced, which alleviates the problem that the weights of the encoding model are inaccurate because the gradient of the whole error decreases exponentially until disappearing, thereby improving the accuracy of sentence processing.

Figure 14:
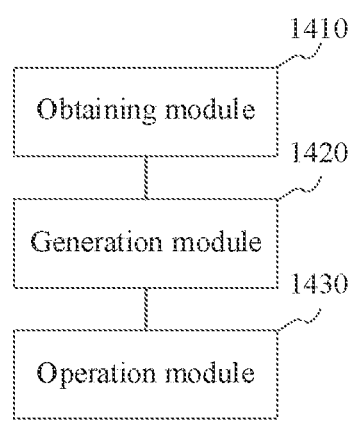
FIG. 14 is a structural block diagram of a sentence decoding apparatus according to some embodiments of this disclosure.

FIG. 14 is a structural block diagram of a sentence decoding apparatus according to still an embodiment of this disclosure. The sentence decoding apparatus is applicable to a decoding model, the decoding model includes a processing node, and the processing node includes a first unit and at least one second unit that are cascaded. The sentence decoding apparatus includes:

an obtaining module 1410, configured to obtain a sentence vector and a $j^{th}$ query state at a $j^{th}$ moment, the sentence vector being obtained after a source sentence to be encoded is encoded by using an encoding model, the $j^{th}$ query state being used for querying an encoded part in the source sentence at the $j^{th}$ moment;

a generation module 1420, configured to generate a $j^{th}$ source-language-focused context according to the sentence vector and the $j^{th}$ query state, the $j^{th}$ source-language-focused context being used for indicating the encoded part in the source sentence at the $j^{th}$ moment;

an operation module 1430, configured to perform linear operation and non-linear operation on the $j^{th}$ query state and the $j^{th}$ source-language-focused context by using the first unit in the processing node, and output an obtained $j^{th}$ operation result to the at least one second unit in the processing node for processing to obtain a $j^{th}$ word; and the generation module 1420 being further configured to generate, after obtaining k words, a target sentence according to the k words, j≤k.

In a possible implementation, the decoding model further includes a query node connected to the processing node, and the query node includes a first unit; and the obtaining module 1410 is further configured to:

obtain a $(j-1)^{th}$ decoded state and a $(j-1)^{th}$ word by using the first unit in the query node, where the $(j-1)^{th}$ decoded state is obtained by the processing node according to a $(j-1)^{th}$ operation result, and the $(j-1)^{th}$ decoded state is used for determining the $(j-1)^{th}$ word; and perform linear operation and non-linear operation on the $(j-1)^{th}$ decoded state and the $(j-1)^{th}$ word by using the first unit in the query node to obtain the $j^{th}$ query state.

In a possible implementation, the decoding model further includes a query node connected to the processing node, and the query node includes a first unit and at least one second unit; and the obtaining module 1410 is further configured to:

obtain a $(j-1)^{th}$ decoded state and a $(j-1)^{th}$ word by using the first unit in the query node, where the $(j-1)^{th}$ decoded state is obtained by the processing node according to a $(j-1)^{th}$ operation result, and the $(j-1)^{th}$ decoded state is used for determining the $(j-1)^{th}$ word; and perform linear operation and non-linear operation on the $(j-1)^{th}$ decoded state and the $(j-1)^{th}$ word by using the first unit in the query node, and output an obtained intermediate operation result to the at least one second unit in the query node for processing to obtain the $j^{th}$ query state.

In a possible implementation, the decoding model further includes a query node connected to the processing node, and the query node includes a third unit and at least one second unit; and the obtaining module 1410 is further configured to:

obtain a $(j-1)^{th}$ decoded state and a $(j-1)^{th}$ word by using the third unit in the query node, where the $(j-1)^{th}$ decoded state is obtained by the processing node according to a $(j-1)^{th}$ operation result, and the $(j-1)^{th}$ decoded state is used for determining the $(j-1)^{th}$ word; and perform non-linear operation on the $(j-1)^{th}$ decoded state and the $(j-1)^{th}$ word by using the third unit in the query node, and output an obtained intermediate operation result to the at least one second unit in the query node for processing to obtain the $j^{th}$ query state.

In a possible implementation, the decoding model further includes an attention operation node, and the attention operation node is connected to the encoding model, the query node, and the processing node; and the generation module 1420 is further configured to:

perform attention operation on the sentence vector and the $j^{th}$ query state by using the attention operation node to obtain the $j^{th}$ source-language-focused context.

In a possible implementation, the operation module 1430 is further configured to:

perform element-wise multiplication on the $j^{th}$ query state and a first difference by using the first unit to obtain a first product, where the first difference is equal to a value obtained by subtracting an update gate of the first unit from a predetermined value, and the update gate is used for measuring, in a $j^{th}$ source-language-focused context vector, a ratio of a portion from the $j^{th}$ source-language-focused context and a portion from the $j^{th}$ query state;

perform linear transformation on the $j^{th}$ source-language-focused context by using the first unit through a linear transformation function, and perform element-wise multiplication on an obtained linear transformation function value and a linear transformation gate to obtain a second product: and perform non-linear transformation on the $j^{th}$ source-language-focused context and the $j^{th}$ query state by using a hyperbolic tangent function, and add an obtained hyperbolic tangent function value and the second product to obtain a candidate activation function value, where the linear transformation gate is used for controlling the candidate activation function value to include the linear transformation function value;

perform element-wise multiplication on the update gate and the candidate activation function value by using the first unit to obtain a third product; and add the first product and the third product by using the first unit to obtain the $j^{th}$ operation result.

Based on the above, according to the sentence decoding apparatus provided in the embodiments of this disclosure, the first unit in the processing node may perform linear operation and non-linear operation on the $j^{th}$ query state and the $j^{th}$ source-language-focused context. Therefore, when the decoding model is trained to obtain weights of the decoding model, the first unit outputs data after performing linear operation and non-linear operation on training data. In this way, when an error between an output and a reference result is transmitted through back propagation, the error includes an error of a linear operation part and an error of a non-linear operation part. Since a gradient of the error of the linear operation part is a constant, a decreasing speed of the gradient of the whole error may be reduced, which alleviates the problem that the weights of the decoding model are inaccurate because the gradient of the whole error decreases exponentially until disappearing, thereby improving the accuracy of sentence processing.

This disclosure further provides a server, the server includes a processor and a memory, the memory stores at least one instruction, and the at least one instruction is loaded and executed by the processor to implement the sentence processing method or the sentence decoding method provided in the foregoing method embodiments. The server may be a server provided in FIG. 15 below.

Figure 15:
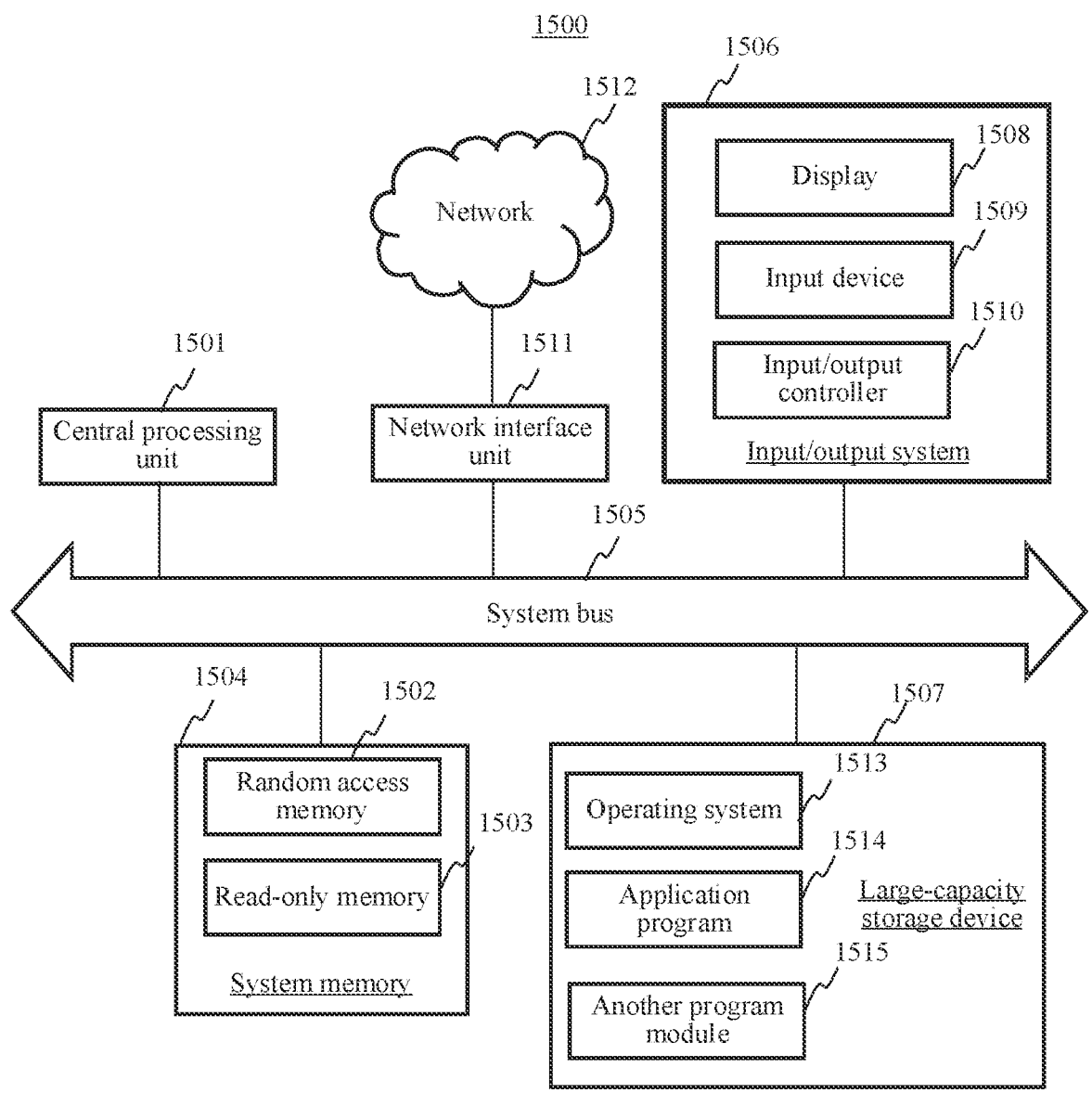
FIG. 15 is a structural block diagram of a server according to still another embodiment of this disclosure.

FIG. 15 is a schematic structural diagram of a server according to an exemplary embodiment of this disclosure. Specifically, the server 1500 includes a central processing unit (CPU) 1501, a system memory 1504 including a random access memory (RAM) 1502 and a read-only memory (ROM) 1503, and a system bus 1505 connecting the system memory 1504 and the CPU 1501. The server 1500 further includes a basic input/output system (I/O system) 1506 for transmitting information between components in a computer, and a large-capacity storage device 1507 configured to store an operating system 1513, an application program 1514, and another program module 1515.

The basic I/O system 1506 includes a display 1508 configured to display information and an input device 1509 such as a mouse or a keyboard that is configured to allow a user to input information. The display 1508 and the input device 1509 are both connected to the CPU 1501 by using an input/output controller 1510 connected to the system bus 1505. The basic I/O system 1506 may further include the input/output controller 1510, to receive and process inputs from a plurality of other devices, such as the keyboard, the mouse, or an electronic stylus. Similarly, the input/output controller 1510 further provides an output to a display screen, a printer or another type of output device.

The large-capacity storage device 1507 is connected to the CPU 1501 by using a large-capacity storage controller (not shown) connected to the system bus 1505. The large-capacity storage device 1507 and an associated computer-readable storage medium provide non-volatile storage for the server 1500. That is, the large-capacity storage device 1507 may include a computer-readable storage medium (not shown), such as a hard disk or a CD-ROM drive.

Without loss of generality, the computer-readable storage medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, a person skilled in the art may know that the computer storage medium is not limited to the foregoing types. The system memory 1504 and the large-capacity storage device 1507 may be collectively referred to as a memory.

The memory stores one or more programs, and the one or more programs are configured to be executed by one or more CPUs 1501. The one or more programs include instructions used for implementing the sentence encoding or the sentence decoding method, and the CPU 1501 executes the one or more programs to implement the sentence processing method or the sentence decoding method provided in the foregoing method embodiments.

According to the embodiments of the present invention, the server 1500 may further be connected, through a network such as the Internet, to a remote computer on the network. That is, the server 1500 may be connected to a network 1512 by using a network interface unit 1511 connected to the system bus 1505, or may be connected to another type of network or a remote computer system (not shown) by using a network interface unit 1511.

The memory further includes one or more programs. The one or more programs are stored in the memory and include steps to be executed by the server in the sentence processing method or the sentence decoding method provided in the embodiments of the present invention.

An embodiment of this disclosure further provides a computer-readable storage medium, the storage medium storing at least one instruction, at least one program, a code set, or an instruction set, the at least one instruction, the at least one program, the code set, or the instruction set being loaded and executed by the processor 1510 to implement the sentence processing method or the sentence decoding method described above.

This disclosure further provides a computer program product, and the computer program product, when run on a computer, causes the computer to perform the sentence processing method or the sentence decoding method according to the foregoing method embodiments.

Some embodiments of this disclosure provide a computer-readable storage medium, the storage medium storing at least one instruction, at least one program, a code set, or an instruction set, the at least one instruction, the at least one program, the code set, or the instruction set being loaded and executed by a processor to implement the sentence processing method or the sentence decoding method described above.

Division of the foregoing functional modules is only described for exemplary purposes when the sentence encoding/decoding apparatus provided in the foregoing embodiment encodes or decodes a sentence. In an actual application, the foregoing functions may be allocated to be accomplished by different functional modules according to requirements, that is, the internal structure of the sentence encoding/decoding apparatus is divided into different functional modules, to accomplish all or a part of the foregoing described functions. Moreover, the embodiments of the sentence encoding/decoding apparatus provided in the foregoing embodiments belong to the same concept as that of the embodiments of the sentence encoding/decoding method. For details of a specific implementation process thereof, refer to the method embodiments. Details are not described herein again.

A person of ordinary skill in the art may understand that all or some of the procedures of the methods in the foregoing embodiments may be implemented by hardware or a computer program instructing relevant hardware. The computer program may be stored in a non-volatile computer-readable storage medium. When the computer program is executed, the procedures of the foregoing method embodiments may be performed. Any reference to a memory, a storage, a database, or another medium used in the embodiments provided in this disclosure may include a non-volatile and/or volatile memory. The non-volatile memory may include a ROM, a programmable ROM (PROM), an electrically programmable ROM (EPROM), an electrically erasable programmable ROM (EEPROM) or a flash memory. The volatile memory may include a RAM or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

The foregoing descriptions are not intended to limit the embodiments of this disclosure. Any modification, equivalent replacement, or improvement made within the spirit and principle of the embodiments of this disclosure shall fall within the protection scope of the embodiments of this disclosure.

What is claimed is:

1. A method for processing a sentence, performed by a sentence processing device and applicable to an encoding model, the encoding model comprising n cascaded encoding processing nodes, the method comprising:
    performing word segmentation operation on a source sentence to be encoded to obtain m words, m<n;
    obtaining an $i^{th}$ word in the m words using an $i^{th}$ encoding processing node in the n encoding processing nodes, the $i^{th}$ encoding processing node comprises a first unit and at least one second unit that are cascaded, n>2;
    obtaining an $(i-1)^{th}$ word vector from an $(i-1)^{th}$ encoding processing node, the $(i-1)^{th}$ word vector being an encoding vector of an $(i-1)^{th}$ word in the m words, i<m;
    performing linear operation on the $i^{th}$ word, using the first unit of the $i^{th}$ encoding processing node, to obtain a linear operation value;
    performing non-linear operation on the $i^{th}$ word and the $(i-1)^{th}$ word vector, using the first unit of the $i^{th}$ encoding processing node, to obtain a non-linear operation value;
    deriving, using the first unit of the $i^{th}$ encoding processing node, an $i^{th}$ operation result based on the linear operation value and the non-linear operation value;
    outputting the $i^{th}$ operation result to the at least one second unit of the $i^{th}$ encoding processing node for processing to obtain an $i^{th}$ word vector as an encoding vector of an $i^{th}$ word in the m words; and
    generating, in response to obtaining m word vectors, a sentence vector according to the m word vectors, the sentence vector being for determining a target sentence or a target category.

2. The method of claim 1, wherein in response to the encoding model being a unidirectional encoding model and an encoding direction being from front to back,
    the $i^{th}$ encoding processing node is a encoding processing node arranged at an $i^{th}$ position in the n encoding processing nodes in front-to-back order; and
    the $i^{th}$ word is a word arranged at an $i^{th}$ position in the m words in front-to-back order.

3. The method of claim 1, wherein in response to the encoding model being a unidirectional encoding model and an encoding direction being from back to front,
    the $i^{th}$ encoding processing node is a encoding processing node arranged at an $i^{th}$ position in the n encoding processing nodes in back-to-front order; and
    the $i^{th}$ word is a word arranged at an $i^{th}$ position in the m words in back-to-front order.

4. The method of claim 1, wherein in response to the encoding model being a bidirectional encoding model and encoding directions are from front to back and from back to front, and m<n/2,
    the $i^{th}$ encoding processing node comprises a encoding processing node arranged at an $i^{th}$ position in the n encoding processing nodes in front-to-back order and a encoding processing node arranged at an $i^{th}$ position in the n encoding processing nodes in back-to-front order; and
    the $i^{th}$ word comprises a word arranged at an $i^{th}$ position in the m words in front-to-back order and a word arranged at an $i^{th}$ position in the m words in back-to-front order.

5. The method of one claim 1, wherein performing linear operation on the $i^{th}$ word, performing non-linear operation on the $i^{th}$ word and the $(i-1)^{th}$ word vector, and deriving the $i^{th}$ operation result using the first unit of the $i^{th}$ encoding processing node comprises:
    performing element-wise multiplication of the $(i-1)^{th}$ word vector and a first difference using the first unit to obtain a first product, wherein the first difference is equal to a value obtained by subtracting an update gate of the first unit from a predetermined value, and the update gate is for measuring a ratio of a portion from the $i^{th}$ word and a portion from the $(i-1)^{th}$ word vector in the $i^{th}$ word vector;
    performing linear transformation on the $i^{th}$ word using the first unit through a linear transformation function to obtain a linear transformation function value;
    performing element-wise multiplication of the linear transformation function value and a linear transformation gate to obtain a second product;
    performing non-linear transformation on the $i^{th}$ word and the $(i-1)^{th}$ word vector through a hyperbolic tangent function to obtain a hyperbolic tangent function value;
    adding the hyperbolic tangent function value and the second product to obtain a candidate activation function value, wherein the linear transformation gate is for controlling the candidate activation function value to comprise the linear transformation function value;
    performing element-wise multiplication of the update gate and the candidate activation function value using the first unit to obtain a third product; and
    adding the first product and the third product using the first unit to obtain the $i^{th}$ operation result.

6. The method of claim 5, wherein the first unit is a gate recurrent unit having a non-linear operation capability and a linear operation capability, and the second unit is a transition gate recurrent unit.

7. The method of claim 1, further comprising a decoding operation using a decoding model, wherein the decoding model comprises a decoding processing node, the decoding processing node comprises a third unit and at least one fourth unit that are cascaded, and the decoding operation comprises:

obtaining the sentence vector and a $j^{th}$ query state at a $j^{th}$ moment, the $j^{th}$ query state being for querying an encoded portion in the source sentence at the $j^{th}$ moment;

generating a $j^{th}$ source-language-focused context according to the sentence vector and the $j^{th}$ query state, the $j^{th}$ source-language-focused context being the encoded portion in the source sentence at the $j^{th}$ moment;

performing linear operation and non-linear operation on the $j^{th}$ query state and the $j^{th}$ source-language-focused context using the third unit of the decoding processing node to obtain an $j^{th}$ operation result; and outputting the $j^{th}$ operation result to the at least one fourth unit of the decoding processing node for processing to obtain a $j^{th}$ word; and generating, in response to obtaining k words, a target sentence according to the k words, j≤k.

8. A method for decoding a sentence, performed by a sentence processing device and applicable to a decoding model, the decoding model comprising a decoding processing node, the decoding processing node comprising a first unit and at least one second unit that are cascaded, the method comprising:

obtaining a sentence vector and a $j^{th}$ query state at a $j^{th}$ moment, the sentence vector being obtained by encoding a source sentence using an encoding model, the $j^{th}$ query state being for querying an encoded portion in the source sentence at the $j^{th}$ moment;

generating a $j^{th}$ source-language-focused context according to the sentence vector and the $j^{th}$ query state, the $j^{th}$ source-language-focused context being the encoded portion in the source sentence at the $j^{th}$ moment;

performing linear operation on the $j^{th}$ source-language-focused context, using the first unit of the decoding processing node, to obtain a linear operation result;

performing non-linear operation on the $j^{th}$ query state and the $j^{th}$ source-language-focused context, using the first unit of the decoding processing node, to obtain a non-linear operation result;

deriving, using the first unit of the decoding processing node, a $j^{th}$ operation result based on the linear operation result and the non-linear operation result;

outputting the $j^{th}$ operation result to the at least one second unit of the decoding processing node for processing to obtain a $j^{th}$ word; and generating, in response to obtaining k words, a target sentence according to the k words, j≤k.

9. The method of claim 8, wherein the decoding model further comprises a query node communicatively connected to the decoding processing node, the query node comprises a linear transformation enhanced gate recurrent unit (L-GRU), and obtaining the $j^{th}$ query state comprises:

obtaining a $(j-1)^{th}$ decoded state and a $(j-1)^{th}$ word using the L-GRU of the query node, wherein the $(j-1)^{th}$ decoded state is obtained according to a $(j-1)^{th}$ operation result, and the $(j-1)^{th}$ decoded state is for determining the $(j-1)^{th}$ word; and performing linear operation and non-linear operation on the $(j-1)^{th}$ decoded state and the $(j-1)^{th}$ word using the L-GRU of the query node to obtain the $j^{th}$ query state.

10. The method of claim 8, wherein the decoding model further comprises a query node communicatively connected to the decoding processing node, the query node comprises a linear transformation enhanced gate recurrent unit (L-GRU) and at least one transition gate recurrent unit (T-GRU), and obtaining the $j^{th}$ query state comprises:

obtaining a $(j-1)^{th}$ decoded state and a $(j-1)^{th}$ word using the L-GRU of the query node, wherein the $(j-1)^{th}$ decoded state is obtained according to a $(j-1)^{th}$ operation result, and the $(j-1)^{th}$ decoded state is for determining the $(j-1)^{th}$ word;

performing linear operation and non-linear operation on the $(j-1)^{th}$ decoded state and the $(j-1)^{th}$ word using the L-GRU of the query node to obtain an intermediate operation result; and outputting the intermediate operation result to the at least one T-GRU of the query node for processing to obtain the $j^{th}$ query state.

11. The method of claim 8, wherein the decoding model further comprises a query node communicatively connected to the decoding processing node, the query node comprises a gate recurrent unit (GRU) and at least one transition gate recurrent unit (T-GRU); and obtaining the $j^{th}$ query state comprises:

obtaining a $(j-1)^{th}$ decoded state and a $(j-1)^{th}$ word using the GRU of the query node, wherein the $(j-1)^{th}$ decoded state is obtained according to a $(j-1)^{th}$ operation result, and the $(j-1)^{th}$ decoded state is for determining the $(j-1)^{th}$ word;

performing non-linear operation on the $(j-1)^{th}$ decoded state and the $(j-1)^{th}$ word using the GRU of the query node to obtain an intermediate operation result; and outputting the intermediate operation result to the at least one T-GRU of the query node for processing to obtain the $j^{th}$ query state.

12. The method of claim 11, wherein the decoding model further comprises an attention operation node, and the attention operation node is communicatively connected to the encoding model, the query node, and the decoding processing node, and generating the $j^{th}$ source-language-focused context according to the sentence vector and the $j^{th}$ query state comprises:

performing attention operation on the sentence vector and the $j^{th}$ query state using the attention operation node to obtain the $j^{th}$ source-language-focused context.

13. The method of claim 8, wherein performing linear operation on the $j^{th}$ source-language-focused context, performing non-linear operation on the $j^{th}$ query state and the $j^{th}$ source-language-focused context, and deriving the $j^{th}$ operation result using the first unit of the decoding processing node comprises:

performing element-wise multiplication on the $j^{th}$ query state and a first difference using the first unit to obtain a first product, wherein the first difference is equal to a value obtained by subtracting an update gate of the first unit from a predetermined value, and the update gate is for measuring a ratio of a portion from the $j^{th}$ source-language-focused context and a portion from the $j^{th}$ query state in a $j^{th}$ source-language-focused context vector;

performing linear transformation on the $j^{th}$ source-language-focused context using the first unit through a linear transformation function to obtain a linear transformation function value;

performing element-wise multiplication on the linear transformation function value and a linear transformation gate to obtain a second product;

performing non-linear transformation on the $j^{th}$ source-language-focused context and the $j^{th}$ query state through a hyperbolic tangent function to obtain a hyperbolic tangent function value;

adding the hyperbolic tangent function value and the second product to obtain a candidate activation function value, wherein the linear transformation gate is for controlling the candidate activation function value to comprise the linear transformation function value;

performing element-wise multiplication on the update gate and the candidate activation function value using the first unit to obtain a third product; and adding the first product and the third product using the first unit to obtain the $j^{th}$ operation result.

14. The method of claim 8, wherein the first unit is a gate recurrent unit having a non-linear operation capability and a linear operation capability, and the second unit is a transition gate recurrent unit.

15. A device for processing a sentence, comprising a memory and a processor, the memory storing computer-readable instructions and an encoding model, the encoding model comprising n cascaded encoding processing nodes, the computer-readable instructions, when executed by the processor, causing the processor to:

perform word segmentation operation on a source sentence to be encoded to obtain m words, m<n;

obtain an $i^{th}$ word in the m words using an $i^{th}$ encoding processing node in the n encoding processing nodes, the $i^{th}$ encoding processing node comprises a first unit and at least one second unit that are cascaded, n>2;

obtain an $(i-1)^{th}$ word vector from an $(i-1)^{th}$ encoding processing node, the $(i-1)^{th}$ word vector being an encoding vector of an $(i-1)^{th}$ word in the m words, i<m;

perform linear operation on the $i^{th}$ word, using the first unit of the $i^{th}$ encoding processing node, to obtain a linear operation value;

perform non-linear operation on the $i^{th}$ word and the $(i-1)^{th}$ word vector, using the first unit of the $i^{th}$ encoding processing node, to obtain a non-linear operation value;

derive, using the first unit of the $i^{th}$ encoding processing node, an $i^{th}$ operation result based on the linear operation value and the non-linear operation value;

output the $i^{th}$ operation result to the at least one second unit of the $i^{th}$ encoding processing node for processing to obtain an $i^{th}$ word vector as an encoding vector of an $i^{th}$ word in the m words; and generate, in response to obtaining m word vectors, a sentence vector according to the m word vectors, the sentence vector being for determining a target sentence or a target category.

16. The device of claim 15, wherein in response to the encoding model being a unidirectional encoding model and an encoding direction being from front to back, the $i^{th}$ encoding processing node is a encoding processing node arranged at an $i^{th}$ position in the n encoding processing nodes in front-to-back order; and the $i^{th}$ word is a word arranged at an $i^{th}$ position in the m words in front-to-back order.

17. The device of claim 15, wherein in response to the encoding model being a unidirectional encoding model and an encoding direction being from back to front, the $i^{th}$ encoding processing node is a encoding processing node arranged at an $i^{th}$ position in the n encoding processing nodes in back-to-front order; and the $i^{th}$ word is a word arranged at an $i^{th}$ position in the m words in back-to-front order.

18. The device of claim 15, wherein in response to the encoding model being a bidirectional encoding model and encoding directions are from front to back and from back to front, and m<n/2, the $i^{th}$ encoding processing node comprises a encoding processing node arranged at an $i^{th}$ position in the n encoding processing nodes in front-to-back order and a encoding processing node arranged at an $i^{th}$ position in the n encoding processing nodes in back-to-front order; and the $i^{th}$ word comprises a word arranged at an $i^{th}$ position in the m words in front-to-back order and a word arranged at an $i^{th}$ position in the m words in back-to-front order.

19. The device of claim 15, wherein the computer-readable instructions, when executed by the processor, cause the processor to:

perform element-wise multiplication of the $(i-1)^{th}$ word vector and a first difference using the first unit to obtain a first product, wherein the first difference is equal to a value obtained by subtracting an update gate of the first unit from a predetermined value, and the update gate is for measuring a ratio of a portion from the $i^{th}$ word and a portion from the $(i-1)^{th}$ word vector in the $i^{th}$ word vector;

perform linear transformation on the $i^{th}$ word using the first unit through a linear transformation function to obtain a linear transformation function value;

perform element-wise multiplication of the linear transformation function value and a linear transformation gate to obtain a second product;

perform non-linear transformation on the $i^{th}$ word and the $(i-1)^{th}$ word vector through a hyperbolic tangent function to obtain a hyperbolic tangent function value;

add the hyperbolic tangent function value and the second product to obtain a candidate activation function value, wherein the linear transformation gate is for controlling the candidate activation function value to comprise the linear transformation function value;

perform element-wise multiplication of the update gate and the candidate activation function value using the first unit to obtain a third product; and add the first product and the third product using the first unit to obtain the $i^{th}$ operation result.

20. A non-transitory machine-readable storage medium, having processor executable instructions and an encoding model stored thereon, the encoding model comprising n cascaded encoding processing nodes, the processor executable instructions being for causing a processor to:

perform word segmentation operation on a source sentence to be encoded to obtain m words, m<n;

obtain an $i^{th}$ word in the m words using an $i^{th}$ encoding processing node in the n encoding processing nodes, the $i^{th}$ encoding processing node comprises a first unit and at least one second unit that are cascaded, n>2;

obtain an $(i-1)^{th}$ word vector from an $(i-1)^{th}$ encoding processing node, the $(i-1)^{th}$ word vector being an encoding vector of an $(i-1)^{th}$ word in the m words, i<m;

perform linear operation on the $i^{th}$ word, using the first unit of the $i^{th}$ encoding processing node, to obtain a linear operation value;

perform non-linear operation on the $i^{th}$ word and the $(i-1)^{th}$ word vector, using the first unit of the $i^{th}$ encoding processing node, to obtain a non-linear operation value;

derive, using the first unit of the $i^{th}$ encoding processing node, an $i^{th}$ operation result based on the linear operation value and the non-linear operation value;

output the $i^{th}$ operation result to the at least one second unit of the $i^{th}$ encoding processing node for processing to obtain an $i^{th}$ word vector as an encoding vector of an $i^{th}$ word in the m words; and generate, in response to obtaining m word vectors, a sentence vector according to the m word vectors, the sentence vector being for determining a target sentence or a target category.

* * * * *